United States Patent
Enge et al.

(10) Patent No.: US 8,811,614 B2
(45) Date of Patent: Aug. 19, 2014

(54) SPACE BASED AUTHENTICATION UTILIZING SIGNALS FROM LOW AND MEDIUM EARTH ORBIT

(71) Applicants: Per K. Enge, Mountain View, CA (US); David A. Whelan, Newport Coast, CA (US); Gregory M. Gutt, Ashburn, VA (US); David Lawrence, Santa Clara, CA (US)

(72) Inventors: Per K. Enge, Mountain View, CA (US); David A. Whelan, Newport Coast, CA (US); Gregory M. Gutt, Ashburn, VA (US); David Lawrence, Santa Clara, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/653,385

(22) Filed: Oct. 16, 2012

(65) Prior Publication Data

US 2014/0104102 A1 Apr. 17, 2014

(51) Int. Cl.
*H04K 1/00* (2006.01)
(52) U.S. Cl.
USPC .......................................................... 380/258
(58) Field of Classification Search
USPC .......................................................... 380/258
See application file for complete search history.

(56) References Cited

U.S. PATENT DOCUMENTS

| | | | |
|---|---|---|---|
| 5,754,657 A | 5/1998 | Schipper et al. | |
| 5,757,916 A | 5/1998 | MacDoran et al. | |
| 6,934,631 B2 | 8/2005 | Dentinger et al. | |
| 7,609,201 B2 | 10/2009 | Masuda | |
| 7,969,354 B2 | 6/2011 | Levin et al. | |
| 8,068,054 B2 | 11/2011 | Levin et al. | |
| 8,068,533 B2 | 11/2011 | Levin et al. | |
| 8,068,534 B2 | 11/2011 | Levin et al. | |
| 2004/0167967 A1* | 8/2004 | Bastian et al. | 709/206 |
| 2005/0192727 A1* | 9/2005 | Shostak et al. | 701/37 |
| 2005/0228558 A1* | 10/2005 | Valette et al. | 701/33 |
| 2005/0228559 A1* | 10/2005 | Bloch et al. | 701/33 |
| 2006/0025897 A1* | 2/2006 | Shostak et al. | 701/1 |
| 2006/0271246 A1* | 11/2006 | Bell et al. | 701/1 |
| 2010/0208634 A1* | 8/2010 | Eng et al. | 370/310 |
| 2012/0028680 A1* | 2/2012 | Breed | 455/556.1 |
| 2012/0131650 A1 | 5/2012 | Gutt et al. | |
| 2012/0144451 A1 | 6/2012 | Gutt et al. | |

OTHER PUBLICATIONS

International Search Report and Written Opinion of the International Searching Authority mailed on Nov. 27, 2013 for PCT Application No. PCT/US2013/059531 filed on Sep. 12, 2013—International Searching Authority—European Patent Office.
Dorothy E. Denning and Peter F. MacDoran, "Location-Based Authentication: Grounding Cyberspace for Better Security", Computer Fraud and Security, Oxford, GB, Feb. 1, 1996, pp. 12-16, XP002117683, ISSN:1361-3723, DOI:10.1016/S1361-3723(97)82613-9, the whole document.

* cited by examiner

*Primary Examiner* — Kambiz Zand
*Assistant Examiner* — Stephen Sanders
(74) *Attorney, Agent, or Firm* — Ameh IP; Lowell Campbell; Elahe Toosi

(57) ABSTRACT

A system and methods for location-based authentication using medium earth orbit (MEO) and low earth orbit (LEO) satellites are presented. Location of a client device is authenticated based on at least one client received MEO satellite signal received from at least one MEO satellite at the client device and at least one client received LEO satellite signal received from at least one LEO satellite at the client device.

20 Claims, 16 Drawing Sheets

PROXIMATE ATTACK:
• STEAL GPS SIGNATURE FROM PARKING LOT
• BUILD & SUBMIT COUNTERFEIT TRANSACTION SPECIFIC TO LOCATION & PRESENT TIME

ATTACKER RECEIVER LOCATION.

VICTIM LOCATION TO BE ATTACKED.

SPACE BASED AUTHENTICATION UTILIZING SIGNALS FROM LOW AND MEDIUM EARTH ORBIT

FIELD

Embodiments of the present disclosure relate generally to cyber and network security. More particularly, embodiments of the present disclosure relate to satellite systems for location-based authentication.

BACKGROUND

A significant fraction of power of satellites signals such as a Global Navigation Satellite System (GNSS) signal may be lost in urban and indoor environments where satellites signals are frequently blocked. Blocking satellite signals weakens coverage in urban and indoor environments, and loss of power degrades performance in low signal-to-noise ratio (SNR) environments. Degraded performance in low SNR environments may prevent or minimize an ability of an authentication system to validate that a position computation or an assertion based on a position is bona fide.

SUMMARY

A system and methods for location-based authentication using medium earth orbit (MEO) and low earth orbit (LEO) satellites are presented. A likelihood that a client device is at a location is estimated based on at least one client received MEO satellite signal received from at least one MEO satellite at the client device and at least one client received LEO satellite signal received from at least one LEO satellite at the client device. A client MEO signal signature is received comprising samples over an MEO signature time period of a signal received from an MEO satellite. A server MEO signal signature is constructed comprising samples over the MEO signature time period of a signal received from the MEO satellite. A client LEO signal signature is received comprising samples over an LEO signature time period of a signal received from an LEO satellite. A server LEO signal signature is constructed comprising samples over the LEO signature time period of a signal of the LEO satellite. A location of a client device is authenticated based on a comparison of the client MEO signal signature and the server MEO signal signature, and a comparison of the client LEO signal signature and the server LEO signal signature.

In this manner, embodiments of the disclosure provide protection against spoofing and counterfeiting such as proximate and offshore attacks, and strong coverage in urban and indoor environments where satellites signals are frequently blocked.

In an embodiment, a method for location-based authentication using medium earth orbit (MEO) and low earth orbit (LEO) satellites receives a client MEO signal signature comprising samples over an MEO signature time period of a client received MEO satellite signal received from an MEO satellite. The method further constructs a server MEO signal signature comprising samples over the MEO signature time period of a server received MEO satellite signal received from the MEO satellite. The method further compares the client MEO signal signature and the server MEO signal signature to provide an MEO comparison result. The method further receives a client LEO signal signature comprising samples over an LEO signature time period of a client received LEO satellite signal received from an LEO satellite. The method further constructs a server LEO signal signature comprising samples over the LEO signature time period of at least one server LEO satellite signal received from the LEO satellite. The method further compares the client LEO signal signature and the server LEO signal signature to provide an LEO comparison result. The method further authenticates a location of a client device based on the MEO comparison result and the LEO comparison result.

In another embodiment, a location-based authentication system using medium earth orbit (MEO) and low earth orbit (LEO) satellites comprises an authentication module that authenticates that a client device is at a location based on a client received MEO satellite signal received from an MEO satellite at the client device and a client received LEO satellite signal received from an LEO satellite at the client device.

In a further embodiment, a non-transitory computer readable storage medium comprises computer-executable instructions for client location-based authentication that receive an MEO satellite signal from an MEO satellite at a client device to provide a client received MEO satellite signal. The computer-executable instructions further receive an LEO satellite signal from an LEO satellite at the client device to provide a client received LEO satellite signal. The computer-executable instructions further construct a client MEO signal signature comprising samples over an MEO signature time period of the client received MEO satellite signal. The computer-executable instructions further construct a client LEO signal signature comprising samples over an LEO signature time period of the client received LEO satellite signal. The computer-executable instructions further transmits the client MEO signal signature, the client LEO signal signature, samples over the MEO signature time period, and samples over the LEO signature time period to a server for authentication of a location of the client device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
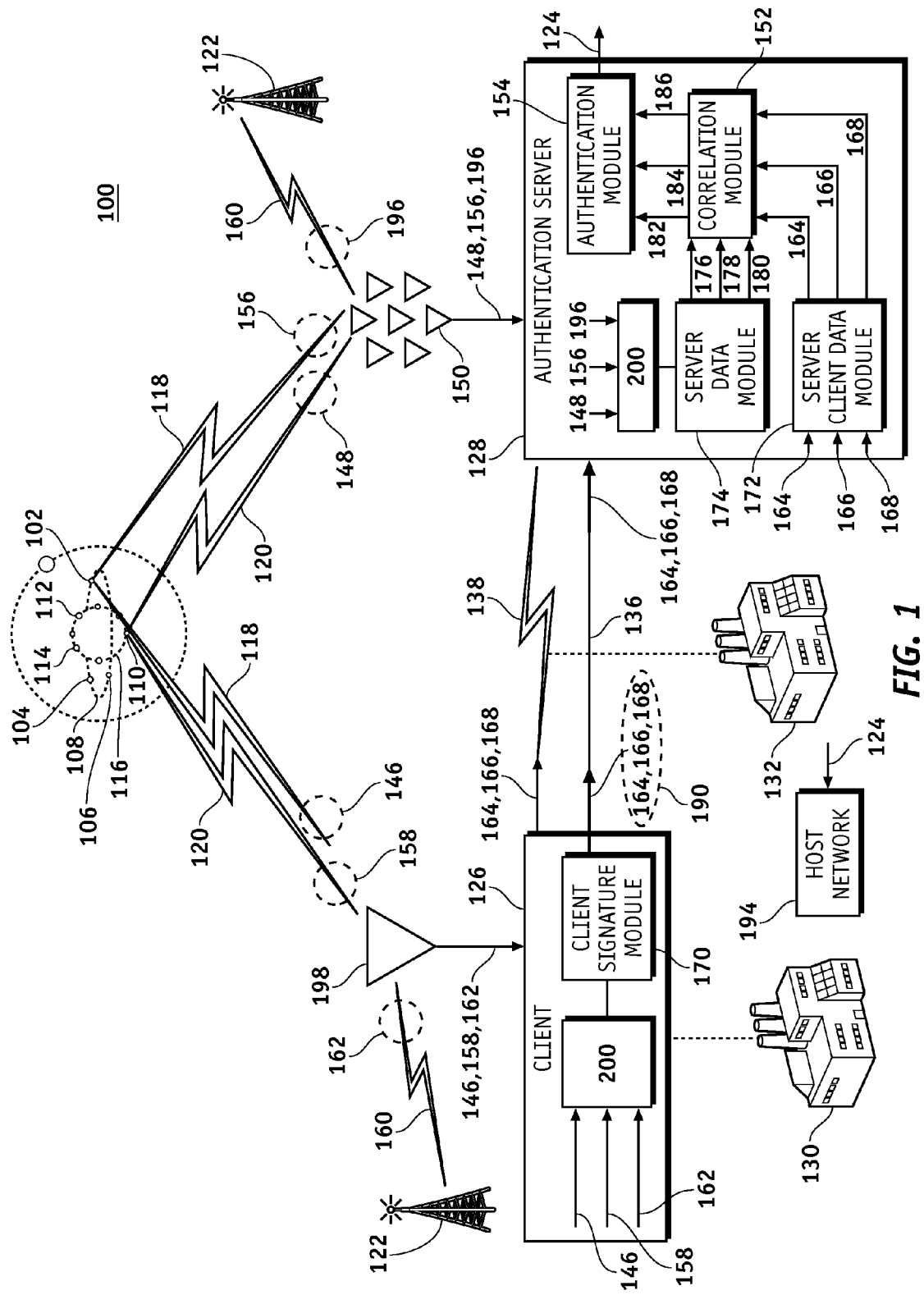
FIG. 1 is an illustration of an exemplary wireless communication system for authenticating an asserted location according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to communication systems, network protocols, global positioning systems, satellites, and other functional aspects of the systems (and the individual operating components of the systems) may not be described in detail herein.

Embodiments of the disclosure are described herein in the context of a non-limiting application, namely, an authentication system for a mobile phone application. Embodiments of the disclosure, however, are not limited to such mobile phone applications, and the techniques described herein may also be utilized in other applications. For example, embodiments may be applicable to a desktop computer, a laptop or notebook computer, an iPod™, an iPad™, a cell phone, a personal digital assistant (PDA), a mainframe, a server, a router, an internet protocol (IP) node, a server, a Wi-Fi node, a client, or any other type of special or general purpose computing device as may be desirable or appropriate for a given application or environment.

As would be apparent to one of ordinary skill in the art after reading this description, the following are examples and embodiments of the disclosure and are not limited to operating in accordance with these examples. Other embodiments may be utilized and changes may be made without departing from the scope of the exemplary embodiments of the present disclosure.

Embodiments of the disclosure provide an authentication system that provides adequate received signal strength for a satellite signal to be received at a client device (client) which may be located in a low signal-to-noise-ratio (SNR) environment such as indoors in a city building. In one embodiment signals from satellites in low earth orbit (LEO) and medium earth orbit (MEO) are combined. In another embodiment, the MEO and/or LEO satellite signals are augmented by coded signals from terrestrial sources.

By combining the LEO and MEO signals, embodiments overcome likely attempts to counterfeit a digital signature from the client. Two example attack strategies that may be used by counterfeiters comprise: a proximate attack and an offshore attack. Compared to existing solutions, embodiments of the disclosure provide a more secure authentication system due to greatly increasing a cost and a complexity of a counterfeiting attack. For an example, embodiments of the disclosure can force a proximate attacker to deploy attack receivers within tens of meters of a victim location. For another example, embodiments of the disclosure can force an offshore attacker to deploy complicated receivers within tens of kilometers (or even hundreds of meters) of the victim location.

Moreover, an embodiment requires that a digital signature contain codes from two overlapping antenna beams. By so doing, the embodiment can force an offshore attacker to be within tens of kilometers of the victim location. If a transaction is of high value, then the authentication server may ask for a second signature taken at a time when two beams overlap over an asserted location. Such overlap situations can arise within a few tens of seconds.

In other embodiments, terrestrial sources of secure/secret signatures are used in conjunction with MEO and LEO satellite signals. A coverage ground antenna footprint of ground transmitters can be very small (hundreds of meters) and so force an attack receiver to be very close to the victim location.

FIG. 1 is an illustration of an exemplary wireless communication system 100 (system 100) for authenticating an asserted location based on satellite signals according to an embodiment of the disclosure. The system 100 may comprise MEO satellites 102, 104 and 106, orbiting in a medium earth orbit (MEO) 108, LEO satellites 110, 112 and 114, orbiting in a low earth orbit (LEO) 116, an optional terrestrial broadcast station 122 (terrestrial source 122), a client 126 comprising a satellite receiver 200, an authentication server 128 comprising a satellite receiver 200, and a host network 194.

In one embodiment, an MEO satellite signal 118 from at least one of the MEO satellites 102, 104, and 106 in MEO 108 and an LEO satellite signal 120 from at least one of the LEO satellites 110, 112 and 114 in LEO 116 are combined.

In another embodiment, the MEO satellite signal 118 from at least one of the MEO satellites 102-106 in the MEO 108 and the LEO satellite signal 120 from at least one of the LEO satellites 110-114 in LEO 116 are augmented by coded terrestrial signals 160 from the terrestrial source 122.

The LEO satellites 110-114 may comprise, for example but without limitation, satellites from the Iridium™, Iridium™ NEXT, GlobalStar constellations, or other satellite that may be utilized for position, navigation, or timing related applications.

The MEO satellites 102-106 may comprise, for example but without limitation, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, or other satellite that may be utilized for position, navigation, or timing related applications.

The terrestrial source 122 may comprise a cell phone base station, a wireless or wired access point, or other terrestrial source.

The MEO satellite signal 118 from the MEO satellite 102 can be processed at the client receiver module 200 of the client 126 to determine location 130, velocity and time of the client 126. The LEO satellite signal 120 from the LEO satellite 110 (e.g., Transit Satellite Navigation) can also be processed to yield estimates of location 130, velocity and time of the client 126.

The location 130 of the client 126 may be estimated using measurements made available from the MEO satellite signal 118 from at least one of the MEO satellites 102-106 and the LEO satellite signal 120 from at least one of the LEO satellites 110-114. The estimates of the location 130 are based on a minimum set of signal sources. System 100 applies to similar systems with a few MEO satellites plus a few LEO satellites, with or without a high quality user clock. Any suitable mathematical technique may be used to estimate the location 130 based on, for example, a minimum set of signal sources.

System 100 enables space-based authentication indoors and downtown. System 100 is configured to work with sparse sets of visible satellites; one MEO satellite 102 and one LEO satellite 110 are sufficient. If one MEO satellite 102 and one LEO satellite 110 are visible, then the system 100 is capable of instantaneously estimating and authenticating location in two dimensions if a third dimension (e.g., altitude) is known and the user equipment has a clock with adequate accuracy.

The client 126 (client device 126) may comprise the satellite receiver 200 (client receiver module 200), and a client signature module 170. The client 126 is configured to track and locate the client 126 based on receiving at least one of the MEO satellite signal 118 and/or the LEO satellite signal 120 via a client antenna 198 as explained above.

The client receiver module 200 is configured to receive at least one MEO satellite signal 118 from at least one MEO satellite 102 at the client 126 to provide at least one client received MEO satellite signal 146. The client receiver module 200 is also configured to receive at least one terrestrial signal 160 from at least one terrestrial source 122 at the client device 126 to provide at least one client received terrestrial signal 162. The client receiver module 200 is also configured to receive at least one LEO satellite signal 120 from at least one LEO satellite 110 at the client device 126 to provide at least one client received LEO satellite signal 158.

The client signature module 170 is configured to construct a client MEO signal signature 164 comprising samples over an MEO signature time period of at least one client received MEO satellite signal 146. The client signature module 170 is also configured to construct a client LEO signal signature 166 comprising samples over an LEO signature time period of at least one client received LEO satellite signal 158. The client signature module 170 is also configured to construct a client terrestrial signal signature 168 comprising a client terrestrial time window of at least one client received terrestrial signal 162. The client received MEO satellite signals 146, the client received LEO satellite signal 158, and the client received terrestrial signal 162 may be collectively referred to as client received signals 146, 158, 162 herein. Also, the client MEO signal signature 164, the client LEO signal signature 166, and the client terrestrial signal signature 168 may be collectively referred to as signature signals 164, 166 and 168, a client signature set 190, or location signatures 190 herein.

Data transmission of the client terrestrial signal signature 168 from the client device 126 to the authentication server 128 may be sent in a single wideband signature from the client or in a plurality of separate data packets. At least one terrestrial source 122 may also send a single or multiple data transmissions to the authentication server 128.

The client 126 may support many consumer applications. For example, many financial transactions utilize cell phones as the client 126 indoors in a city building. The client 126 may comprise, wired or wireless communication devices such as, but without limitation, a desktop computer, a laptop or notebook computer, an iPod™, an iPad™, a cell phone, a personal digital assistant (PDA), a mainframe, a server, a router, an internet protocol (IP) node, a server, a Wi-Fi node, or any other type of special or general purpose computing device that comprises the satellite receiver 200 capable of receiving the client received MEO satellite signal 146, and as may be desirable and appropriate for a given application or environment.

The authentication server 128 is configured to receive or estimate the signature signals 164, 166 and 168 (client signature set 190) for the location 130. The authentication server 128 may receive the client signature set 190 via a wired communication link 136, a wireless communication channel 138, a combination thereof, or estimate the client signature set locally at the authentication server 128. The authentication server 128 may comprise the satellite receiver 200 (server receiver module 200), a server client data module 172, a server data module 174, a correlation module 152, and an authentication module 154.

The server receiver module 200 may also be configured to receive at least one MEO satellite signal 118 at the authentication server 128 (server device 128) to provide at least one server received MEO satellite signal 156. The server receiver module 200 is also configured to receive at least one LEO satellite signal 120 at the server device 128 to provide the at least one server LEO satellite signal 148. The server receiver module 200 may also be configured to receive at least one terrestrial signal 160 at the server device 128 to provide the at least one server received terrestrial signal 196. The server LEO satellite signal 148, the server received MEO satellite signal 156, and the server received terrestrial signal 196 may be collectively referred to as server received signals 148, 156, 196 herein.

The client received LEO satellite signal 158 may comprise two client received LEO satellite signals (e.g., overlap area 712 FIG. 7) received from two of the LEO satellites 110 and 112. The server LEO satellite signal 148 may comprise two server received LEO satellite signals (e.g., overlap area 712 FIG. 7) from the two of the LEO satellites 110 and 112.

The server client data module 172 is configured to receive the client MEO signal signature 164 comprising samples over an MEO signature time period of at least one client received MEO satellite signal 146 received from at least one of the MEO satellites 102-106. The server client data module 172 is also configured to receive a client LEO signal signature 166 comprising samples over an LEO signature time period of at least one client received LEO satellite signal 158 received from at least one LEO satellite 110. The server client data module 172 may also be configured to receive a signal signature 168 comprising a time window of at least one client received terrestrial signal 162 received from at least one terrestrial source 122.

The server data module 174 is configured to construct a server MEO signal signature 176 comprising samples over the MEO signature time period of at least one server received MEO satellite signal 156 received from at least one MEO satellite 102. The server data module 174 is also configured to construct a server LEO signal signature 178 comprising samples over the LEO signature time period of at least one server LEO satellite signal 148 of at least one LEO satellite 110. The at least one server LEO satellite signal 148 may be transmitted to or received from the at least one LEO satellite 110. The server data module 174 may also be configured to construct a server terrestrial signal signature 180 comprising the client terrestrial time window of at least one server received terrestrial signal 196 received from at least one terrestrial source 122. The server data module 174 may be operable to function with various types of satellite signals (e.g., from Iridium—LEO, MEO satellites, etc.), and various numbers of the server data module 174 may be used. For example, there may be separate server data modules 174 for each signal type received.

The correlation module 152 (comparison module 152) is configured to compare the client MEO signal signature 164 and the server MEO signal signature 176 to provide an MEO comparison result 182. The correlation module 152 is also configured to compare the client LEO signal signature 166 and the server LEO signal signature 178 to provide an LEO comparison result 184. In an embodiment, the correlation module 152 may also be configured to compare the client terrestrial signal signature 168 and the server terrestrial signal signature 180 to provide a terrestrial comparison result 186.

The authentication module 154 is configured to authenticate the location 130 of the client device 126 based on the MEO comparison result 182 and the LEO comparison result 184. In one embodiment, the authentication module 154 is configured to authenticate the location 130 of the client device 126 based on the MEO comparison result 182, the LEO comparison result 184, and the terrestrial comparison result 186. The authentication module 154 is also configured to generate an authentication message 124 indicating an authentication decision. In at least one embodiment, the authentication module 154 may be configured to generate an authentication message 124 that may be used by another module to make the authentication decision and may further assist in carrying out the appropriate action associated with that decision which may comprise, without limitation, granting the client device 126 access to a protected resource and rejecting the client device 126 access to a protected resource.

In at least one embodiment, the authentication module 154 used to make the authentication is a part of a same authentication system 100. In at least one other embodiment, the authentication module 154 used to make the authentication is a part of a host network 194 separate from the authentication server 128, for example, where an authentication service is provided to the host network 194.

The host network 194 may comprise, for example but without limitation, a bank, an e-commerce system, a financial institution, or other system. For example, an authentication response in the host network 194 may be responsible for managing policies such as authentication decision policies. The authentication response may comprise a position estimate and a covariance and the host network 194 may uses its decision policies to determine if the client device 126 is within defined thresholds for authentication or whether authentication should be rejected. The host network 194 may also take other authentication/authorization information into account prior to providing/restricting access to a protected resource.

An attacker may attempt to spoof the satellite signals such that the client 126 senses and/or reports a false position 132. Spoofing may be of general concern because networked systems are increasingly being used to support location transactions that have financial value or safety-of-life implications.

Figure 4:
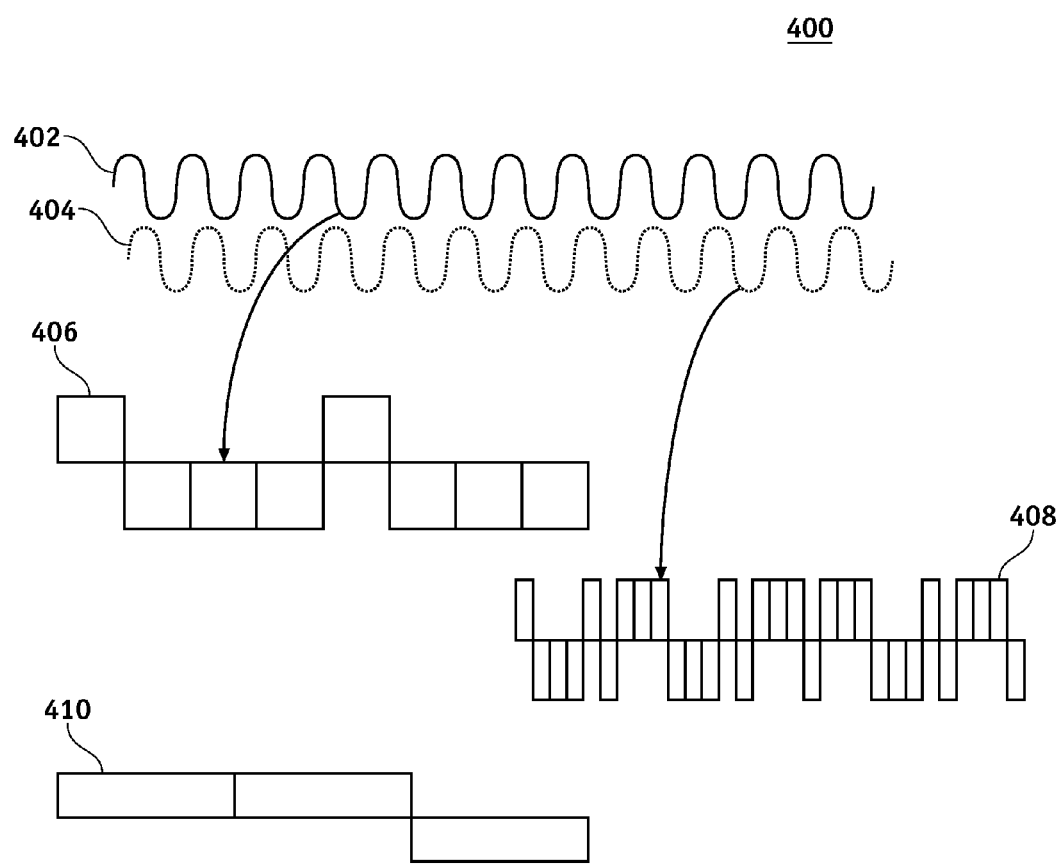
FIG. 4 is an illustration of an exemplary diagram showing a signal structure of a navigation satellite in medium earth orbit (MEO).

System 100 overcomes likely attempts to counterfeit a signature set from the client 126 by utilizing secure/secret codes broadcast by the LEO satellites 110-114, the MEO satellites 102-106 and the terrestrial source(s) 122 as explained in more detail below in the context of discussion of FIGS. 4 and 6 below. In this manner, system 100 fends off sophisticated attempts to counterfeit the signature set in the proximate and offshore attacks. The term secure/secret codes may be used in this document to refer to codes that are used to make information selectively accessible.

Compared to existing systems, system 100 provides better indoor and downtown coverage, because the authentication message 124 can be produced based on one LEO satellite signal and one MEO satellite signal as explained in more detail in the context of discussion of FIG. 5 below.

Many financial transactions utilize mobile devices such as cell phones or laptops such as the client 126 indoors or downtown. Such financial transactions may occur on platforms that are low cost and operating in obstructed signal environments. Two criteria may be important to a design of such a cost-effective satellite-based authentication system. First, data should be available from the satellite receiver 200 included in the cell phone. Second, the satellite-based authentication system should operate with the client received signals 146, 158, and 168 that are expected where cell phone users congregate—indoors and downtown. The first criterion is reflected in FIG. 2 that shows basic signal processing steps in the satellite receiver 200. The second criterion for a satellite-based authentication system is depicted in FIG. 3.

Figure 2:
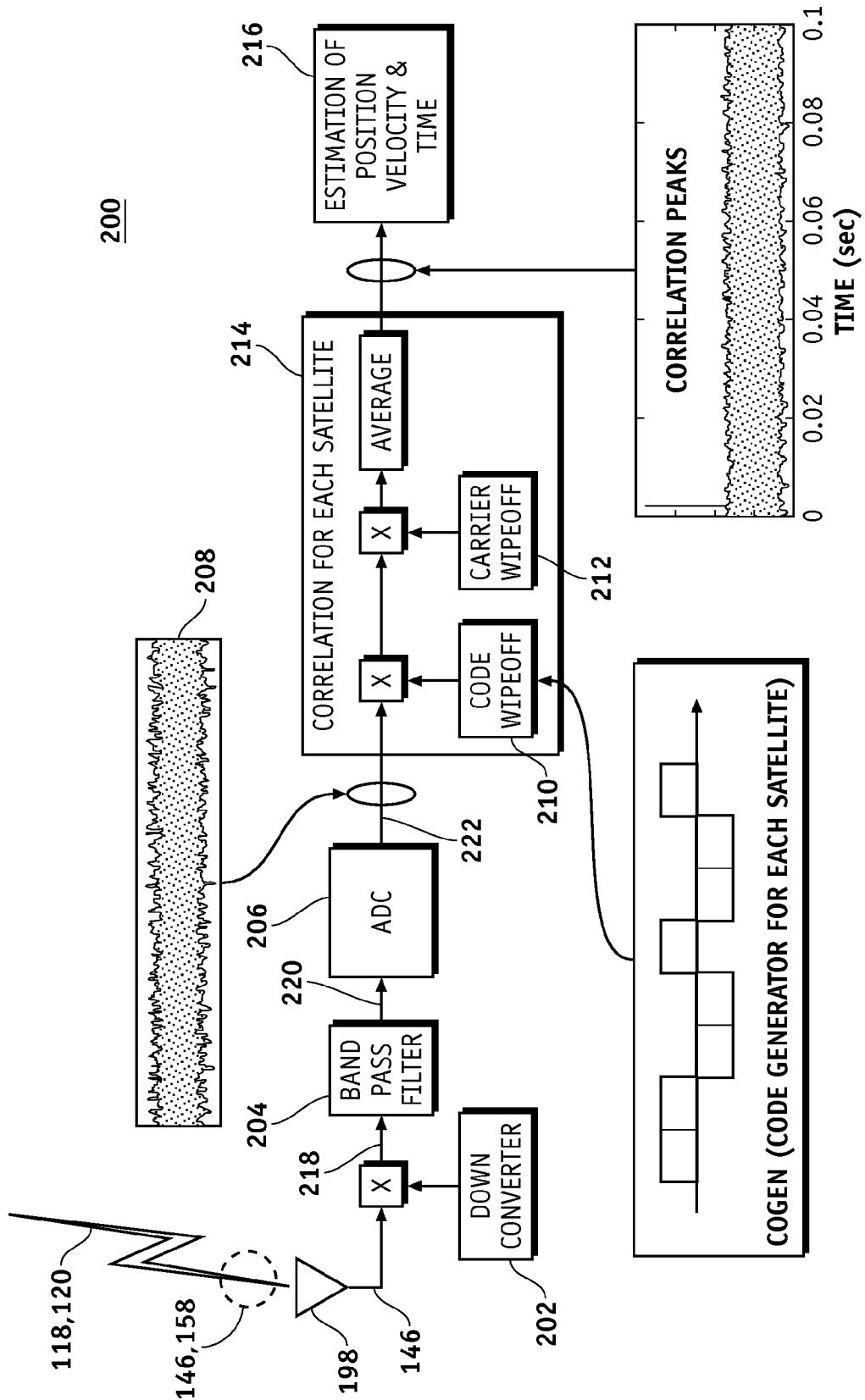
FIG. 2 is an illustration of an exemplary simplified functional block diagram of a navigation satellite receiver.
Figure 3:
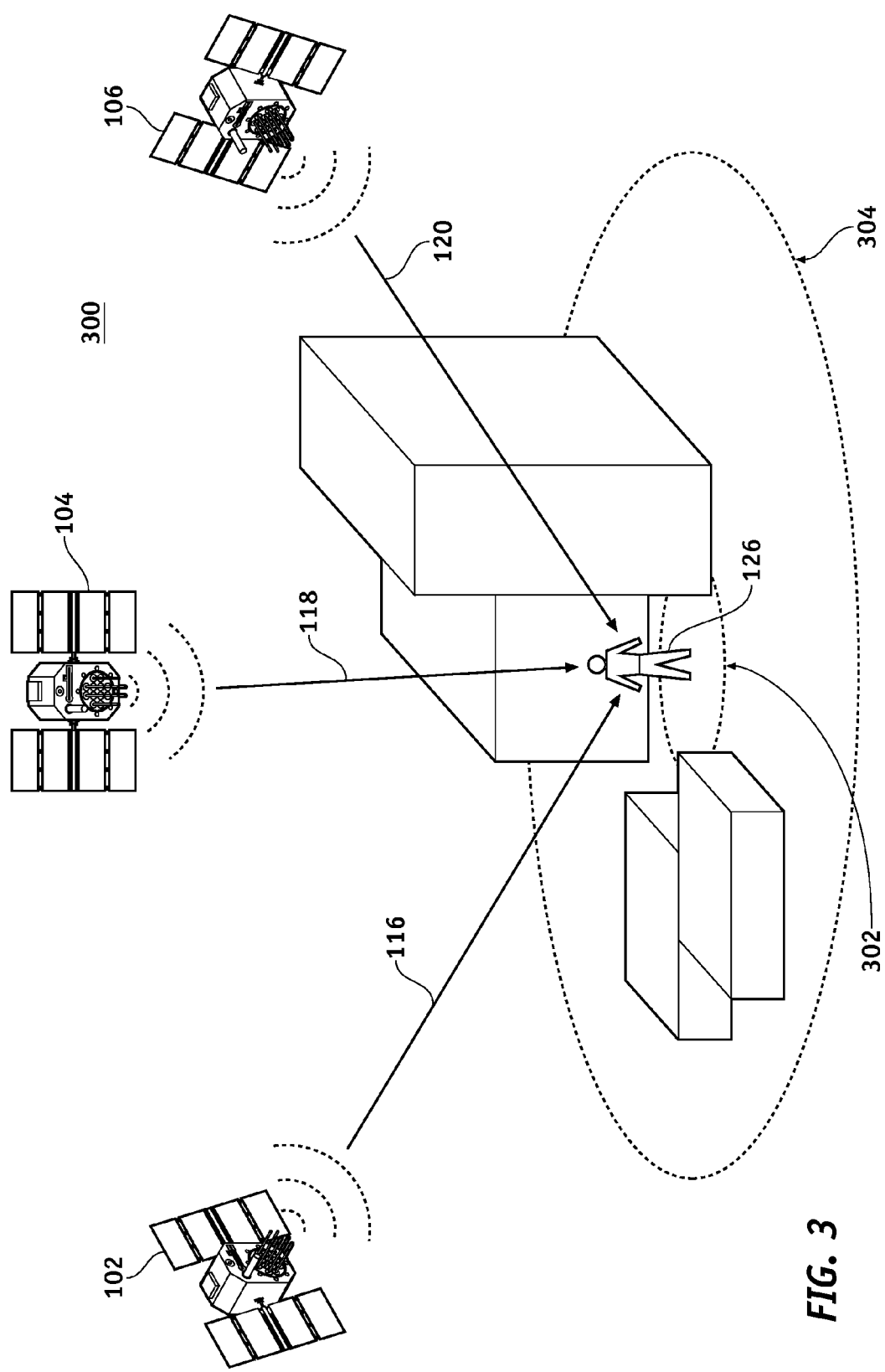
FIG. 3 is an illustration of an exemplary wireless communication environment showing ways in which indoor and downtown environments can block navigation satellite signals.

FIG. 2 is an illustration of an exemplary simplified functional block diagram of the satellite receiver 200 shown in FIG. 1. The satellite receiver 200 may comprise satellite receiver elements widely used for estimating location from global navigation satellites systems. The satellite receiver 200 shown in FIG. 1 may use existing satellite receiver architecture to utilize existing infrastructure and receivers, thereby not adding significant complexity to a receiver. The satellite receiver 200 may comprise, for example but without limitation, an LEO satellite receiver, an MEO satellite receiver, or other receiver. FIG. 2 is an exemplary simplified function block diagram of a satellite receiver widely used for estimating location from global navigation satellites systems. The satellite receiver 200 shown in FIG. 1 makes use of an architecture of the satellite receiver in large extent, without adding appreciable complexity to receivers represented by FIG. 2.

As shown in FIG. 2, the satellite receiver 200 (client receiver module 200) receives radio frequency signals such as the client received MEO satellite signal 146, and the client received LEO satellite signal 158 at the client antenna 198. The satellite receiver 200 then demodulates the client received MEO satellite signal 146, and the client received LEO satellite signal 158 from the MEO satellite signal 118 and the LEO satellite signal 120 received at the client 126 respectively. The satellite receiver 200 demodulates the client received MEO satellite signal 146, and the client received LEO satellite signal 158 by down converting the client received MEO satellite signal 146, and the client received LEO satellite signal 158 from radio frequency (RF) to an intermediate frequency (IF) or baseband by the down convertor 202 and band pass filtering the down converted client received signals 218 by the band pass filter 204.

The satellite receiver 200 then converts low pass or band pass filtered client received signals 220 from analog signals to digital signals by an analog to digital converter (ADC) 206 to provide digital client received signals 222. The satellite receiver 200 then removes a C/A code from the digital client received signals 222 by a code wipe-off 210. The satellite receiver 200 may then remove the in-phase carrier 402 from the digital client received signals 222 by a carrier wipe-off 212. Code and carrier wipe-off is generally used in consumer receivers similar that of FIG. 2, but code and carrier wipe-off may or may not occur in receiver 200.

The satellite receiver 200 then correlates the digital client received signals 222 with respective replicas of the digital client received signals 222 at the client 126 using a correlation module 214 to estimate an estimated pseudo-range for each satellite in view. The estimated pseudo-range for each satellite in view are then used to estimate the location 130, a velocity and a time offset of the client 126 at an output 216. The location 130 can be computed using one LEO satellite and one MEO satellite as explained above.

FIG. 3 is an illustration of an exemplary wireless communication environment (environment 300) showing ways in which indoor and downtown environments can block navigation satellite signals. A nominal received signal strength 304 of the received GPS signal may be, for example, approximately −130 dBm (or 10E−16 Watts). The satellite receiver 200 under open sky can expect the nominal received signal strength 304. However, the client 126 such as a cell phone may operate indoors in a city building where an attenuated received signal strength 302 drops to −140 dBm or −160 dBm or even weaker. Thus, the authentication server 128 may be capable of operating at these lower levels of the attenuated received signal strength 302. Zone Name: A1,AMD FIG. 4 is an illustration of an exemplary diagram 400 showing a signal structure 400 broadcast by an MEO satellite. The MEO satellite signal 118 comprises a signal 402 at frequency L1, which is used as a carrier (in-phase carrier 402) to modulate the navigation message 410 that is modulated with a Code Division Multiple Access (CDMA) code 406, commonly referred to as a "Coarse/Acquisition" (C/A) code. For a GPS system, the C/A code may be variously known as "Coarse/Acquisition", "Clear/Access", and "Civil/Access". The MEO satellite signal 118 transmits at least one other signal employing the same carrier frequency that is shifted 90 degrees (quadrature signal 404). For GPS, the quadrature signal 404 is modulated by another code, known as an encrypted "P(Y)" code 408. The P(Y) code 408 is either a "precision" (P) code, which is publicly known (known (P) code), or an encrypted "Y" code (unknown code (Y). GNSS satellites use an unknown code and, consequently, a resulting transmitted signal that is encoded with the unknown code cannot be used by anyone other than those who have a decryption algorithm and key for the unknown code.

The navigation message 410 modulates both the known and unknown codes broadcast by the MEO satellites 102-106. The navigation messages 410 comprise information such as location and time of the MEO satellite 102 coarse location of the other MEO satellites 104, 106, and other information. The navigation messages 410 modulates both the known code and the unknown code broadcast by for example the MEO satellites 102, via the MEO satellite signal 118. For GNSS, the navigation messages 410 are broadcast at 50 to 1000 bit per second (bps), and are thus distinct from spread spectrum codes that also modulate the MEO satellite signal 118 from the MEO satellite 102. The navigation messages 410 vary slowly at 50-1000 bit per second compared to the underlying spectrum-spreading codes at 1.023 Mcps (C/A code) or 10.023 Mcps (Y code).

The C/A code is publicly known and, consequently, the satellite receiver 200 may be subject to a spoofing signal. A hostile party can generate a facsimile of one or more satellite signals that carry incorrect information. An existing satellite receiver at an existing client that accepts the spoofing signal may compute an incorrect position, and may be caused to compute a position that the hostile party wishes to have the existing satellite receiver compute.

Figure 5:
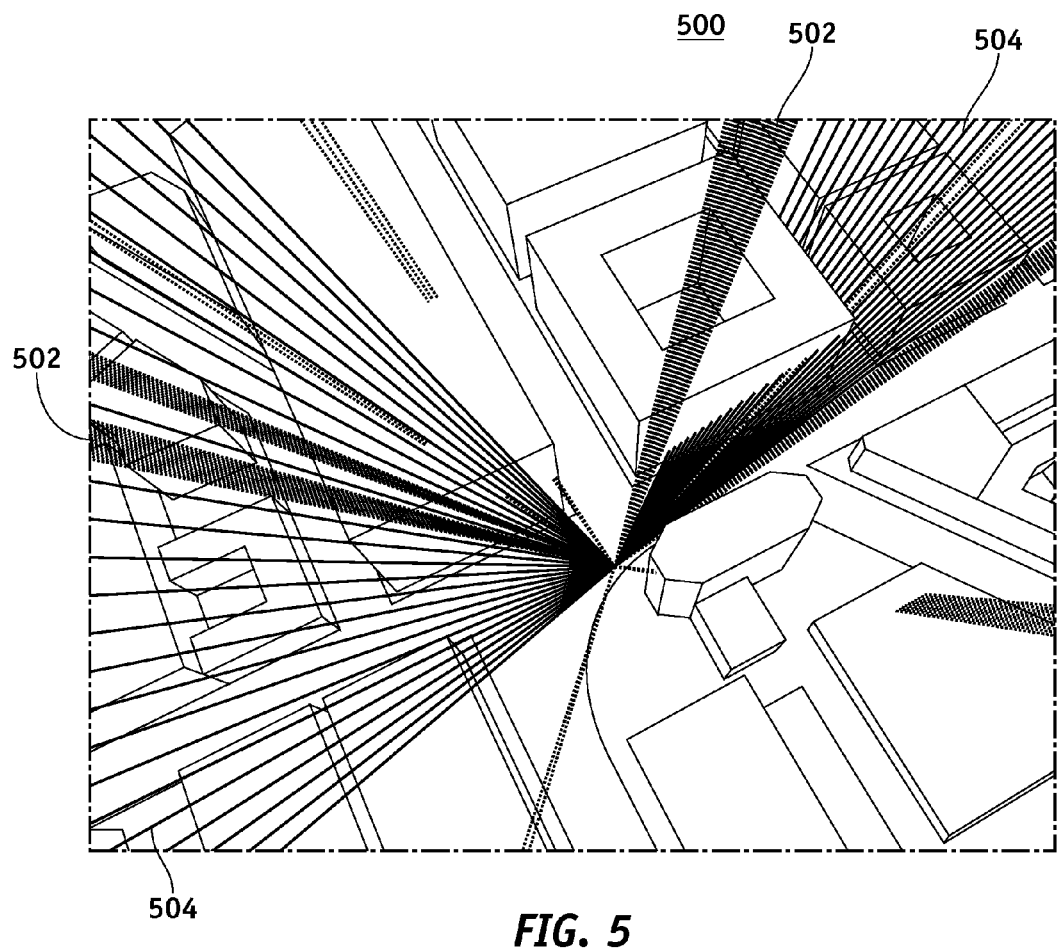
FIG. 5 is an illustration of an exemplary diagram showing line of sight vectors of an MEO satellite (GPS) and a low earth orbit (LEO) satellite (Iridium™) over a city.

FIG. 5 is an illustration of an exemplary diagram showing line of sight vectors 500 of MEO satellites 102-106 (e.g., GPS) and LEO satellites 110-114 (e.g., Iridium™) over a city. As explained above, compared to existing solutions, the system 100 offers better indoor and downtown coverage, because an authenticity decision can be made on a basis of only one LEO satellite and one MEO satellite. FIG. 5 shows line-of-sight vectors 502 of 11 GPS satellites from the MEO 108 and line-of-sight vectors 504 from two LEO satellites from the LEO 116. The line-of-sight vectors 504 from the LEO satellite signal 120 of two LEO satellites 110 and 112 are shown as a fan, because Iridium™ satellites move over much of a sky area in, for example, an approximately 200 second window as shown in FIG. 5.

One of the line-of-sight vectors 504 from the two LEO satellites 110 and 112 is likely to be visible to the client 126, because the LEO satellite signal 120 has much higher received power than the MEO satellite signal 118 by virtue of a lower altitude of the LEO satellite signal 120. A received signal strength from the LEO satellites 110 and 112 may be, for example, approximately 30 to 40 dB more powerful than a received signal strength from the MEO satellites 102-106.

In addition, at least one of the 11 line-of-sight vectors 502 from the MEO 108 may be visible to the client 126, because many navigation satellites are in the MEO 108. One or more of the MEO satellites 102-106 may be visible through a window in a building. Furthermore, one or more MEO satellite signal 118 of the of the MEO satellites 102-106 may be strong enough to propagate through a wall or roof.

Compared to the existing systems, the system 100 significantly improves the indoor and downtown coverage of space-based authentication. In addition, system 100 provides a possibility of using a secure/secret signature broadcast by the terrestrial source 122, which may further strengthen an authentication process in severe signal environments.

In addition, system 100 can overcome likely attempts to counterfeit the signature set 190 from the client 126, because secure/secret codes from either MEO or LEO are not known in advance. In addition, system 100 is also effective against attackers that may try to co-observe the secure/secret codes and broadcast a modified counterfeit in real-time. Two real-time attack strategies that could be used by counterfeiters are considered herein: the proximate attack and the offshore attack as explained in more detail below.

The proximate attack places a receiver close to a victim location. The proximate attack may not require expensive equipment, but an attacking receiver must be close to a victim location so that the attacking receiver captures substantially a same signal signature. System 100 may overcome a proximate attack by utilizing high precision ranging signals such as high precision ranging signals generally broadcast from GNSS satellites in MEO 108. The high precision ranging signals support an instantaneous accuracy of approximately ten meters; thus, by using the high precision ranging signals, embodiments of the disclosure force an attack receiver to be very close to the victim location. At short distances, the attack receiver may be conspicuous and substantially more easily detectable than at a long distance.

Counterfeiters may also attempt a so-called offshore attack in real-time or near real-time. In this case, an attacker processes received signals to build a digital signature that should be received at a remote location. The offshore attack differs from the proximate attack, because the attacker may use more complex signal processing to reduce a number of proximate attack receivers. System 100 overcomes the offshore attack by utilizing LEO satellite signals 120 that have smaller (small) ground antenna footprints 702 (antenna beam footprints 702) (FIG. 7) relative to antenna footprints of MEO satellites. For example, Iridium™ satellites have antenna footprints of only a few hundred kilometers, and a secure/secret code 602 (FIG. 6) may be used which could be unique to each of the small ground antenna footprints 702 (antenna beam footprints 702). Thus, the offshore attacker can be forced to be within a diameter of the small ground antenna footprints 702. Moreover, an embodiment may require that a signature contain the secure/secret code(s) 602 from two overlapping small ground antenna footprints 702 (FIG. 7).

Figure 6:
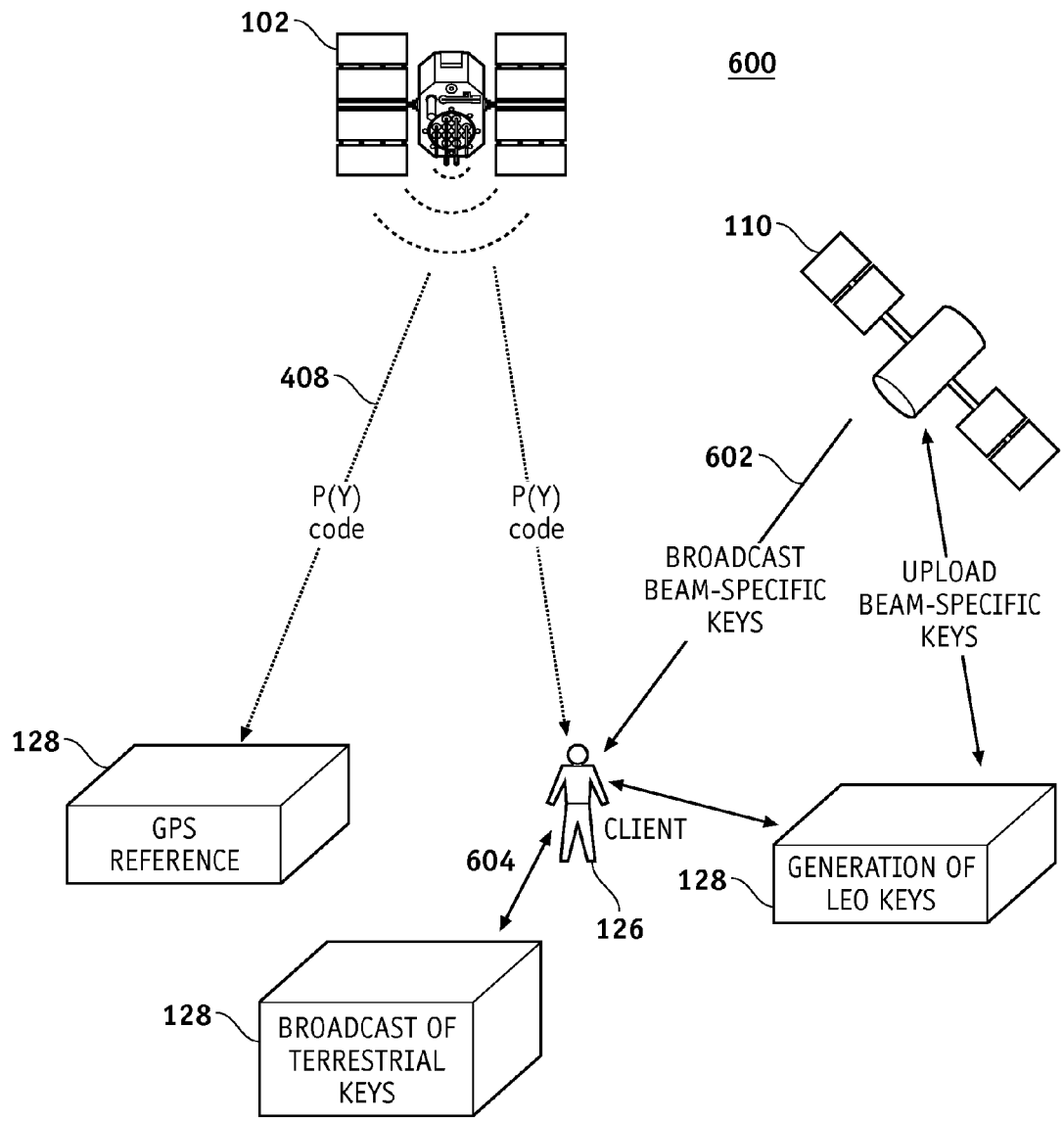
FIG. 6 is an illustration of an exemplary diagram showing an authentication system based on signals from MEO, LEO and terrestrial sources according to an embodiment of the disclosure.
Figure 7:
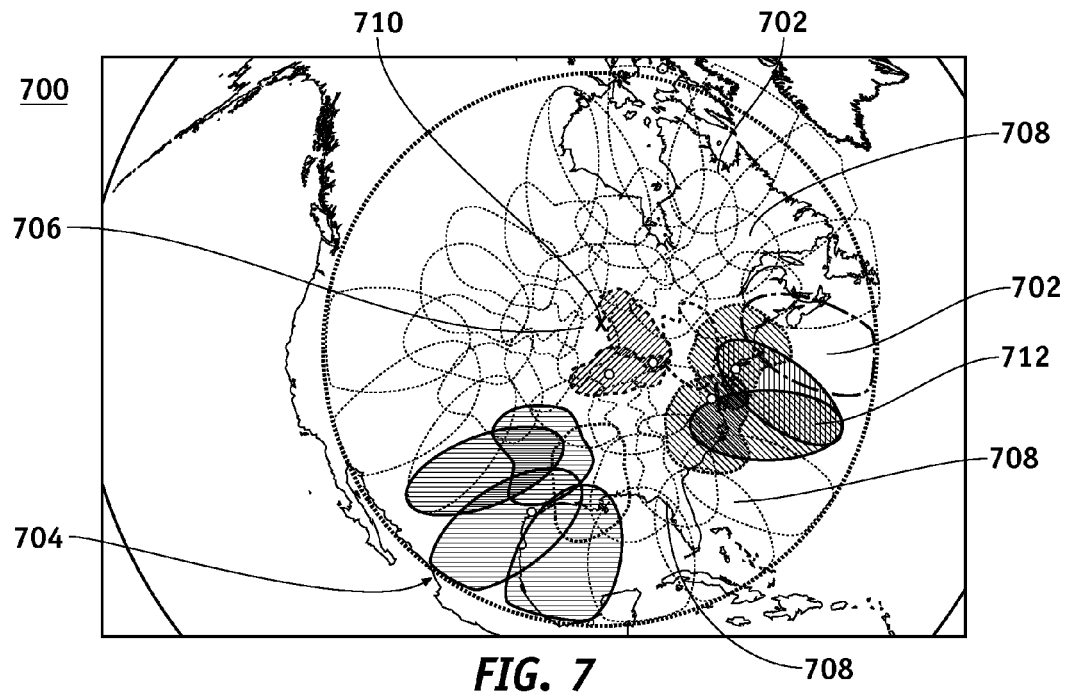
FIG. 7 is an illustration of an exemplary diagram showing antenna beams within one Iridium™ satellite footprint.

FIG. 6 is an illustration of an exemplary diagram showing an authentication system based on signals from MEO, LEO and terrestrial sources according to an embodiment of the disclosure. System 600 utilizes secure/secret codes (e.g., beam-specific keys for the satellite(s) and terrestrial key for the pseudo-satellite(s)) broadcast by the LEO satellite 110 and the MEO satellite 102 and the terrestrial source 122.

The MEO measurements are authenticated by the secure/secret codes 408 associated with most of the Global Navigation Satellite Systems (e.g., Y or M codes within GPS or Public Regulated Service within Galileo. The client 126 collects a radio frequency or intermediate frequency (RF or IF) signature (client MEO signal signature 164) and sends this signature to the authentication server 128. This signature may be accompanied with an asserted location of the location 130, and/or an associated request. The authentication server 128 correlates these snapshots with the secure/secret codes received at another location. The authentication server 128 ascertains that the secure/secret codes 408 within the client signature set 190 have the correct time delay relative to the public codes 406. Alternatively, the authentication server 128 determines that the location 130 of the client 126 based on the client signature set 190 is approximately equal to the asserted client location.

As shown in FIG. 6, the LEO satellite 110 also broadcasts secure/secret codes 602. Once again, the client 126 collects RF and/or IF snapshots (client LEO signal signature 166) and sends them to the authentication server 128 for correlation and validation. In one embodiment, the MEO secure/secret code 408 and the LEO secure/secret code 602 are contained in a single wideband signature such as the signature set 190 from the client 126.

In one embodiment, secure/secret codes 604 from the server terrestrial signal 196 of the terrestrial sources 122 are used. These secure/secret codes 604 are particularly important in signal environments that block satellite signals and when offshore attackers are likely. If the server terrestrial signal 196 is in an adjacent frequency bands, then their signature could also be contained in the LEO/MEO signature of the signature set 190. If not, all three signals (LEO, MEO and terrestrial) could be converted to a common intermediate frequency and thus contained in a common signature in the signature set.

In some embodiments, the codes 604 from the server terrestrial signal 196 of the terrestrial sources 122 may not be secure/secret. By virtue of their coverage area, the codes 604 that are not secure/secret may add an additional obstacle to an electromagnetic attacker without an embedded secure/secret code.

While aspects of correlation processing are similar, several important differences exist between the LEO and MEO signatures. For example, LEO satellite signals 120 are much more powerful than MEO satellite signals 118, because the LEO satellites 110-114 are closer to the earth. However, the MEO satellite signals 118 tend to be more plentiful for any given receiver, because the MEO satellites 102-106 are at higher altitudes and thus more widely visible. As mentioned earlier, these properties are complementary. The client signature set 134 is likely to contain at least one LEO satellite signal 120 and one MEO satellite signal 118, because the signals are powerful and plentiful respectively.

For another example of differences in the LEO and MEO signatures, the client 126 may be a transceiver, and is able to receive and send control signals to the LEO control segment. Thus, it can ask the authentication server 128 to commence transmission of the secure/secret code 602 from the LEO satellite 110. Alternatively, the authentication server 128 may command the client 126 to collect the RF snapshot at a specific time.

For another example of differences in the LEO and MEO signatures, the secure/secret code 602 of the LEO satellite 110 can be transmitted on antenna beams to each of the antenna beam footprints 702 individually within a satellite footprint 700. FIG. 7 shows typical antenna footprints for an Iridium™ satellite over North America.

FIG. 7 is an illustration of an exemplary diagram showing antenna beam footprints 702 within one Iridium™ satellite footprint 700 (footprint 700).

Figure 8:
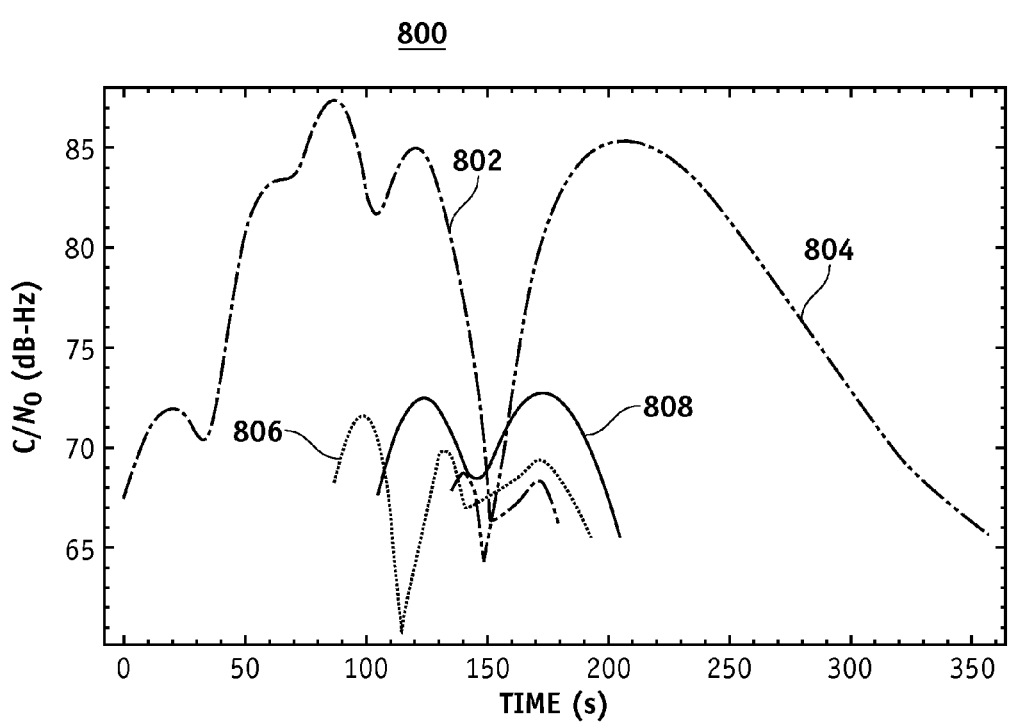
FIG. 8 is an illustration of an exemplary diagram showing signal-to-noise ratio ($C/N_0$) vs. time for four antenna beams from an Iridium™ satellite.

FIG. 7 shows a typical footprint such as the Iridium™ footprint 700 for an Iridium™ satellite over North America. The Iridium™ footprint 700 almost covers North America; a diameter for the footprint 700 is approximately 4000 km. However, the footprint 700 contains more than twenty individual small ground antenna beam footprints 702 (antenna beams 702) that are also shown on FIG. 7. The antenna beam footprints 702 near an edge 704 of the footprint 700 tend to be larger; their long axis can be 500 km or more. Antenna beams 706 near the center 710 of the footprint 700 can be quite small with diameters of 100 km or so. Since the overall footprint 700 passes overhead in eight to ten minutes, and each of the antenna beam footprints 702 may pass individually overhead in 100 to 200 seconds. An overlap area 712 is generally substantially smaller than an area of one of the antenna beam footprints 702. FIG. 8 shows the $C/N_0$ for four of the antenna beam footprints 702 individually when received by a static client such as the client 126.

FIG. 8 is an illustration of an exemplary diagram 800 showing signal-to-noise ratio ($C/N_0$) vs. time for four of the antenna beam footprints 702 from Iridium™ satellite. FIG. 8 shows the $C/N_0$ curves 802/804/806/808 for four of the antenna beams 702 individually when received by a static client such as the client 126. The curves 802 and 804 show $C/N_0$ for the antenna beams 702 that are in view for approximately 200 seconds. The curves 806 and 808 show $C/N_0$ for antenna beams that only last approximately 100 seconds.

The secure/secret MEO codes 408 and LEO codes 602 can be used to authenticate the putative location asserted by the client 126 via the signature set 190, because secure/secret MEO codes 408 and LEO codes 602 are difficult to predict. Thus, an attacker cannot readily obtain and store the signature set 190 for use at an opportune time in the future. More importantly, the space-based authentication system 100 survives the presence of sophisticated spoofers that are trying to counterfeit the signatures in real-time.

By so doing, the system 100 forces the "offshore" attacker to be within tens of kilometers of the victim location. If the transaction is of high value, then the authentication server can simply ask for a second signature taken at a time when two beams overlap over the asserted location. These overlap situations can arise within, for example, approximately a few tens of seconds. The system 100 allows for the inclusion of terrestrial radio signals that carry a secure/secret signature. In this case, the attack radius is reduced to the range of the terrestrial radio signal; this means that the attack receiver may need to be within a few hundred meters of the victim location.

In some embodiments, the system 100 allows for the inclusion of terrestrial radio signals that carry a non-secure/secret signature. In this case, the attack radius can still be reduced to the range of the terrestrial radio signal in that the attack receiver may need to be within a few hundred meters of the victim location even to receive the non-secure/secret signature. Such systems utilizing non-secure/secret signature may utilize existing ground systems that may or may not have a secure/secret code in transmissions.

Figure 9:
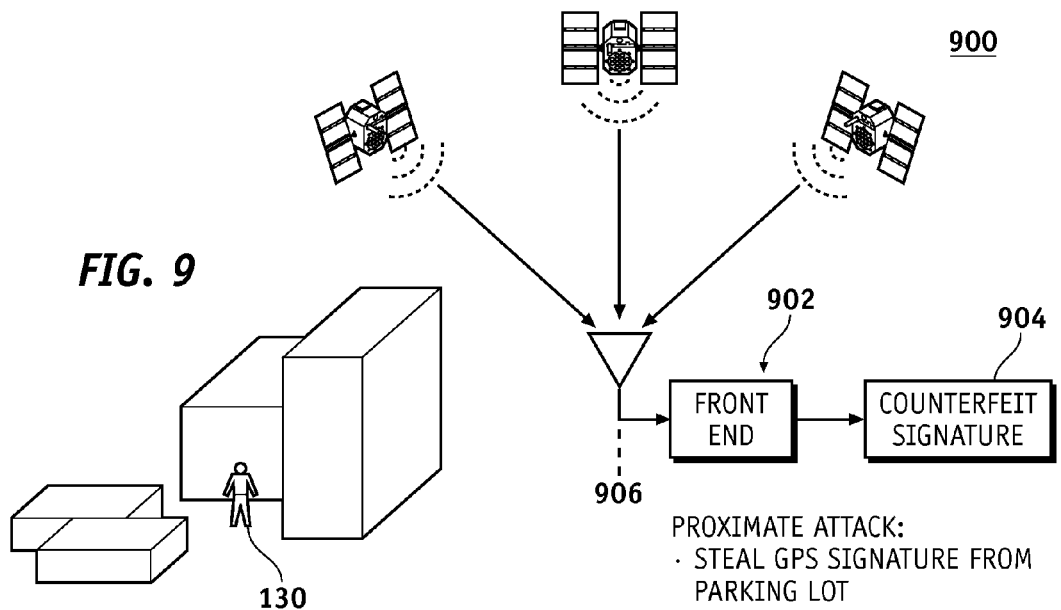
FIG. 9 is an illustration of an exemplary diagram showing a proximate signature counterfeiting attack that can be performed by a signature counterfeiter.

FIG. 9 is an illustration of an exemplary diagram 900 showing a means to defeat proximate signature counterfeiting attack that can be performed by a signature counterfeiter. As shown in FIG. 9, the attacker places a receiver 902 close to the location 130 to be attacked. The attacker wishes to generate a signature that is very similar to the signature set 190 that would be collected at the location 130 under attack. To this end, the attacker simply views the same set of satellites that the (authentic) client 126 would, and generates a counterfeit signature 904 based on these observations. This counterfeit signature 904 is sent with the asserted position fix to the authentication server 128. The attack may be effective, because it is launched from a location 906 that is near the asserted location of the location 130.

Figure 10:
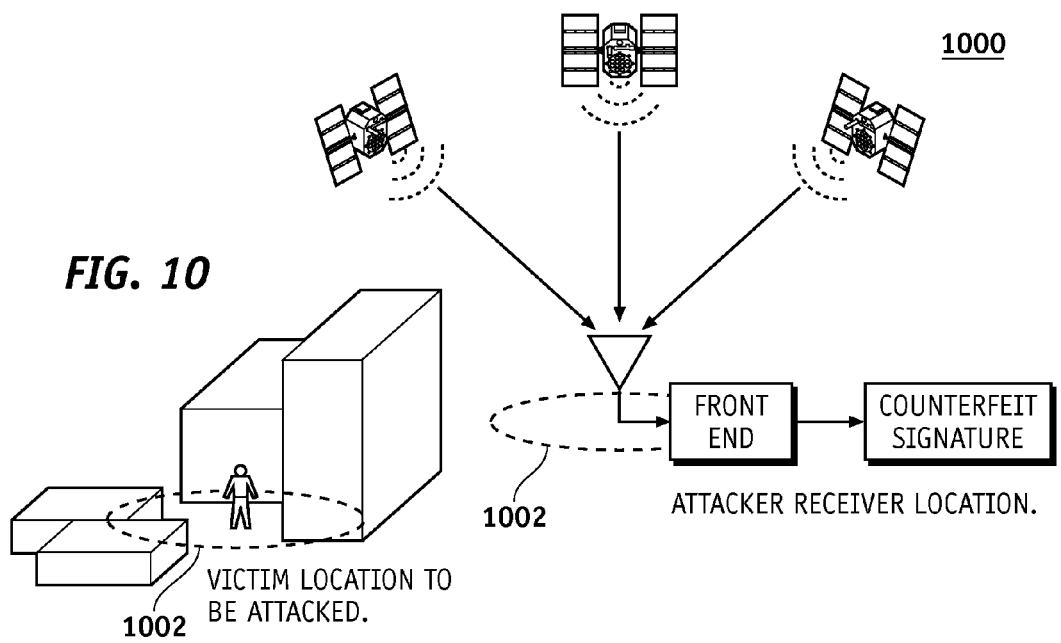
FIG. 10 is an illustration of an exemplary diagram showing defeating a proximate signature counterfeiting attack using MEO satellite signals according to an embodiment of the disclosure.

FIG. 10 is an illustration of an exemplary diagram showing a means to defeat a proximate signature counterfeiting attack using MEO signals according to an embodiment of the disclosure. The MEO portion of the system 100 mitigates the proximate attack, because the MEO secure/secret code 408 has high bandwidth. Therefore, the MEO secure/secret code 408 is very precise and support high accuracy. For example, the Y code accuracy 1002 of GPS is generally better than 5 meters. Even in urban and indoor environments, this accuracy is typically 50 meters or so. Hence, this MEO accuracy can resolve the attack location and the victim location unless the attacker is within 100 meters or so of the asserted location. In addition, the authentication server 128 can detect multiple attacks if they are all generated from a single attack location, for example, the parking lot of a busy mall.

The offshore attack attempts to defeat a combine MEO signature and LEO signature authentication with a sophisticated antenna, receiver and processing system. It differs sharply from the proximate attack. The proximate attack places very simple equipment close to the user location under attack. As such, the proximate attack requires a large deployment effort. After all attack receivers must be placed in proximity to the location to be attacked so that the receiver can capture the satellite signatures from that location. In contrast, the offshore attacker trades processing complexity for proximity. It uses sophisticated signal processing so that it can attack from a distance. This signal processor is used to generate the signatures that would exist at the remote locations under attack. The proximate attack must place a receiver within, for example, approximately 100 meters or so of the location under attack. In contrast, the offshore attack might place its antenna and signal-processing engine, for example, approximately 1000 km or more from the location under attack.

Figure 11:
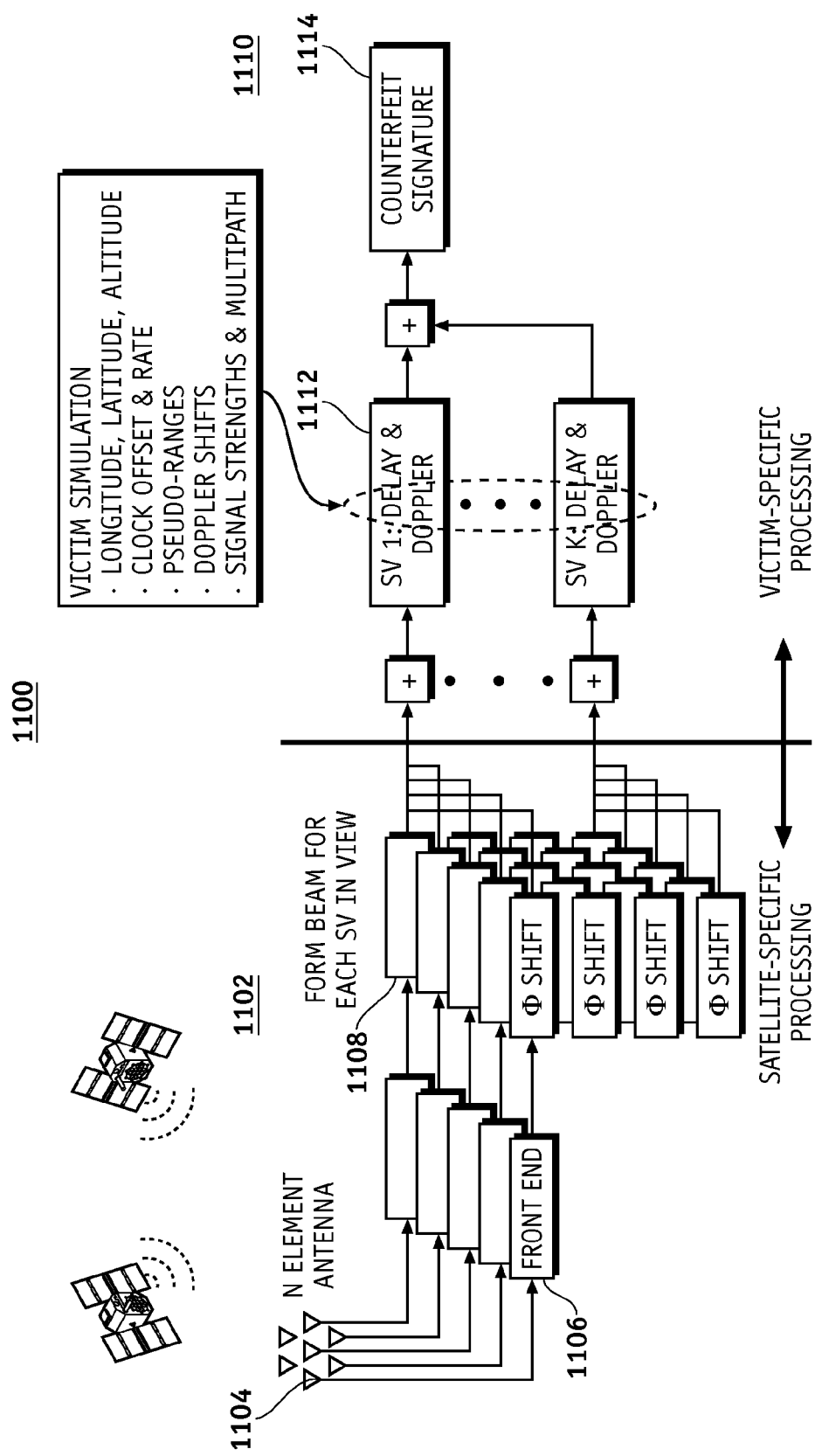
FIG. 11 is an illustration of an exemplary functional block diagram of a simulation system for an offshore signature counterfeiting attack that can be activated by a signature counterfeiter.

FIG. 11 is an illustration of an exemplary functional block diagram of a simulation system 1100 for an offshore signature counterfeiting attack that can be activated by a signature counterfeiter. Many variations exist, but this attack system can be broken into two pieces: satellite-specific processing 1102, and victim-specific processing 1110.

The satellite-specific processing 1102 is used to receive and separate the signals from the different satellites in view of the offshore attacker. Controlled radiation pattern antennas (CRPAs) 1104 may be used to extract the individual satellite signals, but other techniques may be used by the off shore attacker. For example, Doppler shifts or W code processing could be used to separate the satellite signals.

The controlled radiation pattern antenna (CRPA) 1104 can synthesize beams that amplify and isolate the signals from the individual GNSS satellites in view. These signals are processed in individual receiver front ends 1106 that amplify, filter and down convert the signals. Then the signals are phase shifted by phase shifters 1108 to synthesize an individual beam for each satellite in view of the offshore attack facility. The phase shifting operation can be envisaged as a matrix with K rows and N columns, where K is the number of satellites in view and N is the number of elements in the beam-forming antenna. The literature describes many algorithms that can be used to adapt the weights to create beams that point at the individual satellites. These algorithms can also create nulls to attenuate nearby radio frequency interference.

The victim-specific processing 1110 builds the satellite signature for any given victim location by introducing appropriate time delays and Doppler shifts 1112 into the signals separated by the satellite-specific processing 1102. GNSS simulators can be used to provide the appropriate time delay and Doppler shifts 1112 for the client 126 at a victim location such as the location 130. While this process is complicated, suitable (or nearly suitable) simulators exist on the marketplace today.

The victim-specific processing 1110 predicts the pseudo-range delays and Doppler shifts that should exist at the victim location such as the location 130. The predicted pseudo-range delays are used to time shift the signals that have been captured by the satellite-specific processor 1102. The predicted Doppler shifts are used to frequency shift the signals that have been captured by the satellite specific processor 1102. After shifting, the satellite signals are attenuated to emulate the victim environment. Perhaps, multipath is added if the victim location 130 is downtown or indoors. After the individual satellite signals are built they are added together with random noise and sampled to create the counterfeit signal signature 1114.

Figure 12:
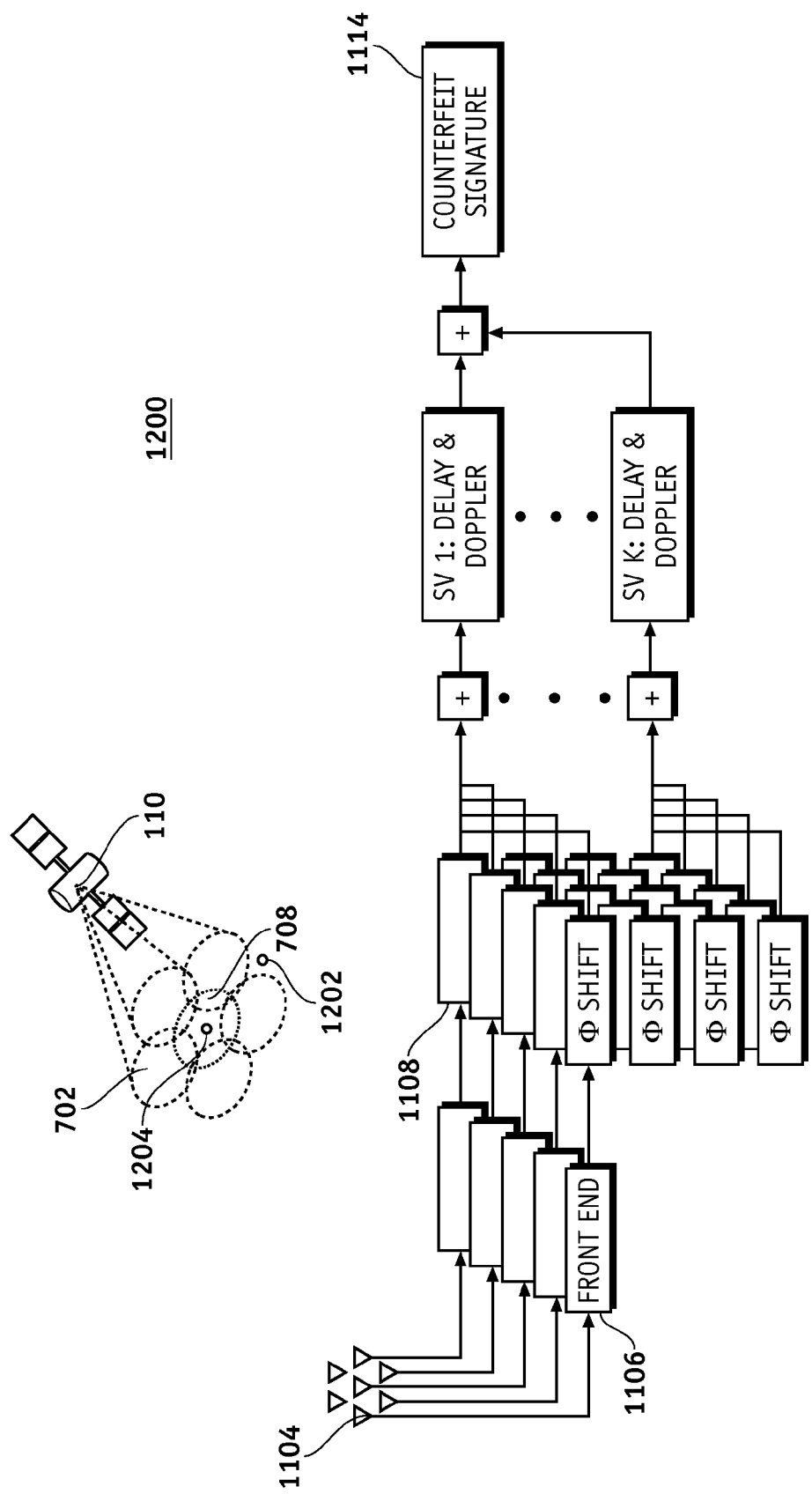
FIG. 12 is an illustration of an exemplary functional block diagram of the simulation system for an offshore signature counterfeiting attack shown in FIG. 10 showing how the offshore signature counterfeiting attack is defeated using LEO satellite signals according to an embodiment of the disclosure.

FIG. 12 is an illustration of an exemplary functional block diagram 1200 of the simulation system for an offshore signature counterfeiting attack shown in FIG. 10 showing how the offshore signature counterfeiting attack is defeated using LEO signals according to an embodiment of the disclosure.

The offshore attack is complicated, but it is feasible. It may even be cost effective if one attack location can attack many victim locations. Fortunately, the system 100 described herein mitigates the feasibility of the offshore attack. System 100 countermeasure the offshore attack based on the LEO satellite 110. As described above, the LEO footprint 700 is approximately 4000 km in diameter. However, it is broken into many small ground antenna beam footprints 702 or the antenna beam footprints 702 as shown in FIG. 7. These individual small ground antenna beam footprints 702 (antenna beams 702) are typically about 100 km across and pass overhead in, for example, about 100 to 200 seconds. System 100 broadcasts a unique code 602 for each beam. In fact, it may only broadcast a unique code 602 in response to the client 126 request for authentication. Thus, the offshore attacker must be within 100 km of the victim location such as the location 130. FIG. 12 depicts this constraint; the attacker located at the 1202 cannot attack the location 1204. Even with the signal processing shown in FIG. 11, the attacker simply cannot see the codes broadcast from the beam that covers the location 1204. Thus, the attacker cannot build the counterfeit signal signature 1114.

System 100 includes two additional features that make the offshore attack even more costly. For high value transactions, the authentication server 128 can require that a putative such as the client 126 provide an RF signature that contains the codes from two overlapping beams. FIGS. 7 and 12 show that beam overlaps 708 are commonplace, but very small in area; some are only tens of kilometers in diameter. Thus the "offshore" attacker would have to be within tens of kilometers of the victim location; it is no longer offshore. A victim location may not lie within one of the beam overlaps 708 at the time of the proffered transaction. If the value of the transaction is high, the authentication server 128 may ask for a second signature at the time of an overlap because the antenna beam footprints 702 from the LEO satellite 110 are moving quickly and the delay would only be tens of seconds as shown in FIG. 8.

Figure 13:
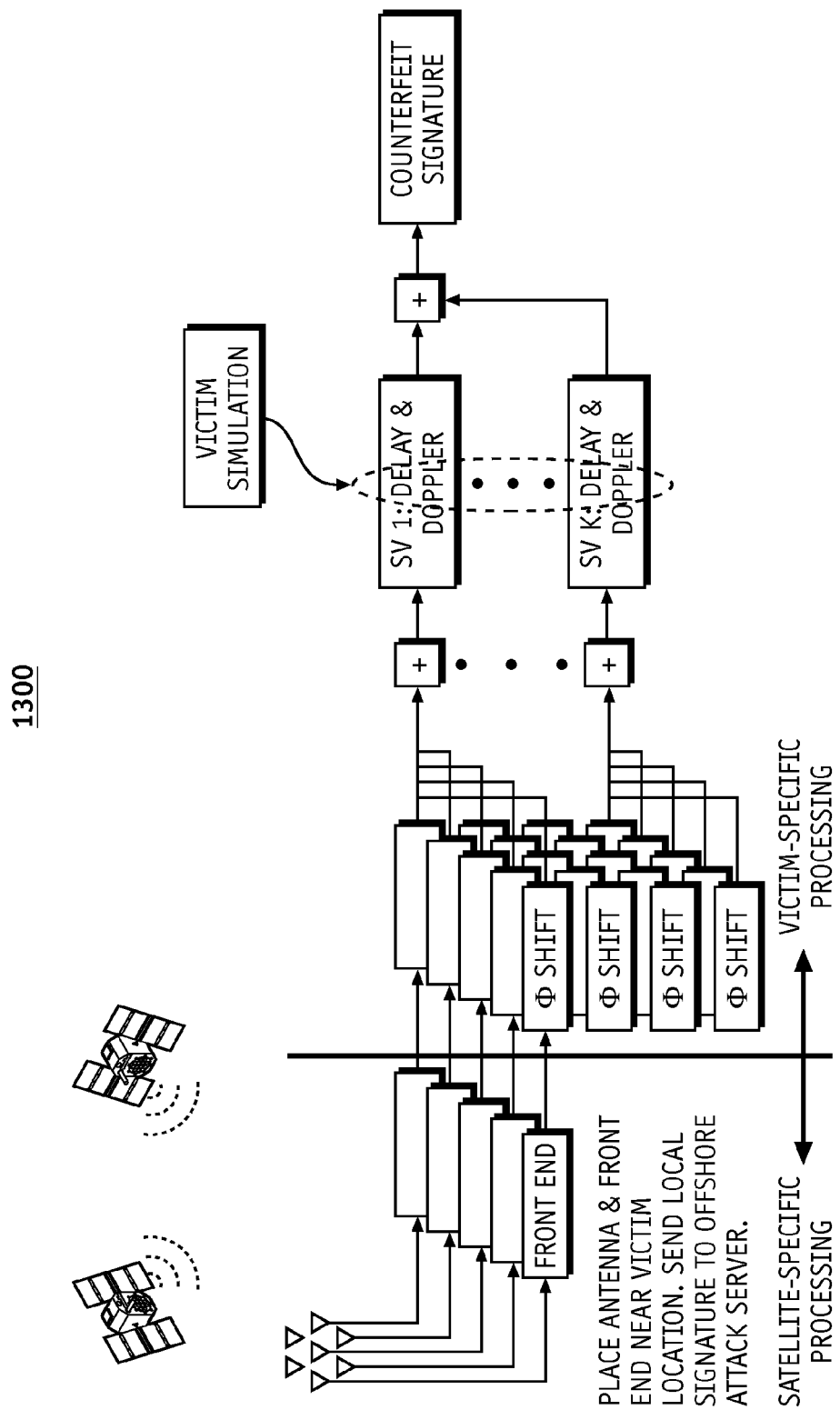
FIG. 13 is an illustration of an exemplary functional block diagram of a simulation system for a hybrid attack signature counterfeiting based on proximate signal capture and offshore processing that can be activated by a signature counterfeiter.

FIG. 13 is an illustration of an exemplary functional block diagram 1300 of a simulation system for a hybrid attack signature counterfeiting based on proximate signal capture and offshore processing that can be activated by a signature counterfeiter.

As shown in FIG. 13, the attacker places the antenna close to the victim location. Thus, the attacker is within the same LEO beam as the victim. Moreover, it can even be within the same beam overlap. The attack hardware may consist of a beam steering antenna or a single element antenna. In either case, the collected signature is backhauled to the attack server over any suitable data link.

The hybrid attack server is more complicated than the offshore attack server. Both must separate the signals from the different satellites, but the hybrid attacker must spawn a separation process for each satellite and victim location. If there are K satellites in view and V victims, then the attack server must support K×V processes. Recall that the offshore attacker only needed to separate the satellite in view of the attack server (K processes). Thus, the system 100 forced the hybrid attacker to suffer both two appreciable costs: measurement equipment proximate to every victim location of interest and a complicated processor with the attendant time delays.

Figure 14:
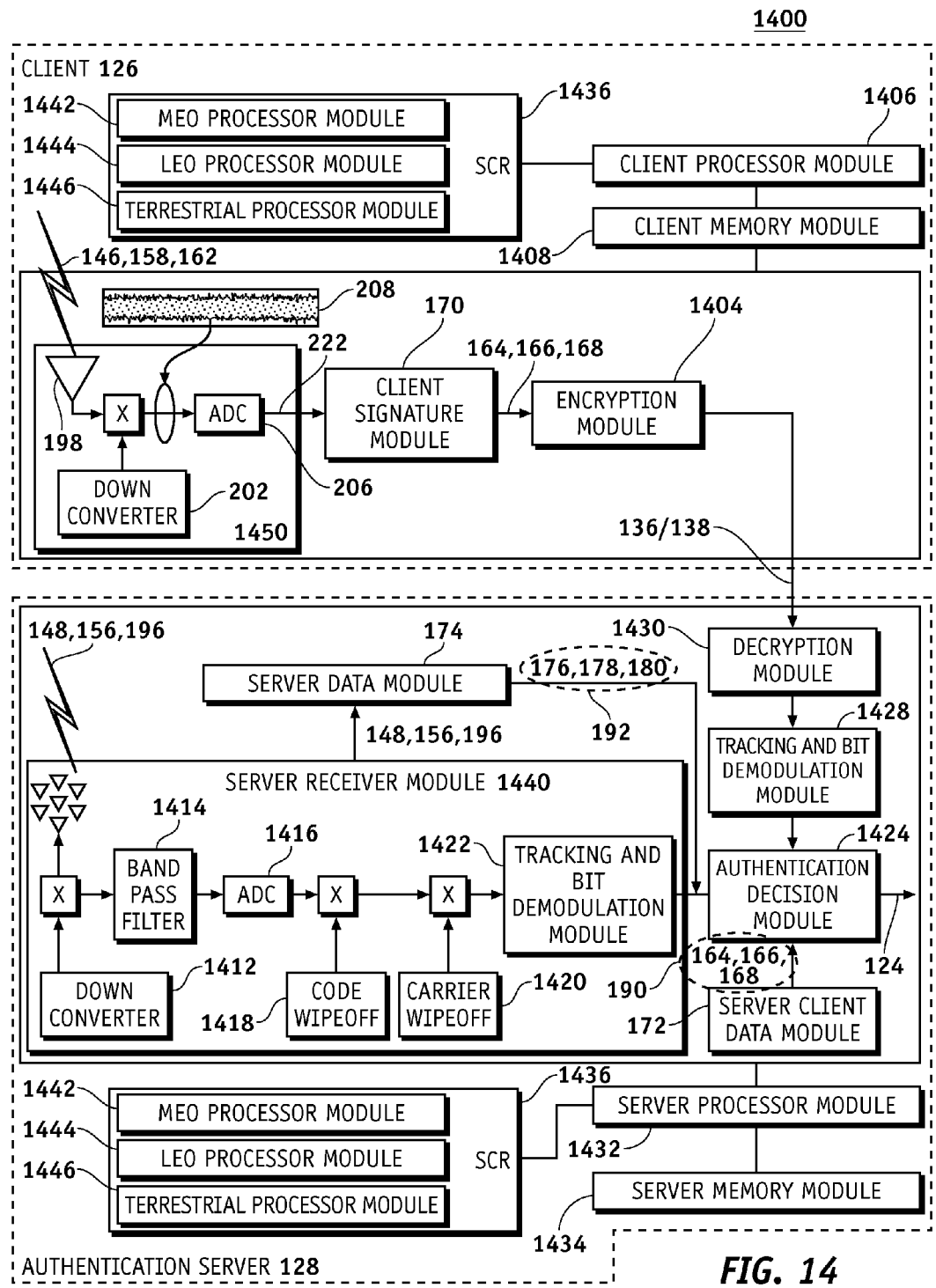
FIG. 14 is an illustration of an exemplary functional block diagram of a space-based authentication system according to an embodiment of the disclosure.

FIG. 14 is an illustration of an exemplary functional block diagram of a space-based authentication system 1400 (system 1400) according to an embodiment of the disclosure. Some embodiments of the system 1400 may comprise additional components and elements configured to support known or conventional operating features that need not be described in detail herein. In the embodiment shown in FIG. 14, the system 1400 can be used to transmit and receive data according to embodiments of the disclosure. System 1400 may have functions, material, and structures that are similar to the embodiments shown in FIGS. 1-8. Therefore common features, functions, and elements may not be redundantly described here.

The system 1400 generally comprises the client 126 and the authentication server 128.

The client 126 may comprise a client demodulation module 1450 comprising: a down converter 202, and an ADC 206, a client signature module 170, an encryption module 1404, a client processor module 1406 (processor module 1406), a client memory module 1408 (memory module 1408), and a software configurable radio module 1436 (SCR 1436).

The SCR 1436 may comprise an MEO processor module 1442, a LEO processor module 1444, and a terrestrial processor module 1446 to demodulate the MEO satellite signal 118, the LEO satellite signal 120 of the client received MEO satellite signal 146 and the coded terrestrial signal 160 respectively. The SCR 1436 may manage a contribution of the MEO satellite signal 118, the LEO satellite signal 120 and the coded terrestrial signal 160 to authentication of a location of the client 126.

The client signature set 190 sent from the client 126 to the authentication server 128 via signature signals 164, 196, 168 respectively comprises the RF/IF signature 208. The RF/IF signature 208 comprises samples of the client received MEO satellite signals 146, the client received LEO satellite signals 158, and the client received terrestrial signals 162 (radio frequency (RF) or intermediate frequency (IF) signal) captured by the client antenna 198 at the client 126, generating the client signature set 190.

In the embodiment shown in FIG. 14, the client 126 need not track the client received MEO satellite signals 146, the client received LEO satellite signals 158, and the client received terrestrial signals 162. As shown in FIG. 14, tracking and bit demodulation are performed by a tracking and bit demodulation module 1428 located at the authentication server 128. However other arrangements may also be used.

The authentication server 128 may comprise the server antenna 150, a server demodulation module 1440, an authentication decision module 1424, a tracking and bit demodulation module 1422, the server data module 174, the server client data module 172, a decryption module 1430, a server processor module 1432 (processor module 1432), a server memory module 1434 (memory module 1434), and the software configurable radio module 1436 (SCR 1436).

The server demodulation module 1440 comprises, a down converter 1412 configured to perform conversion from RF to baseband, a band pass filter 1414 configured to perform a band pass filtering, an ADC 1416 configured to perform analog to digital conversion, a code wipe-off 1418 configured to remove the C/A code, and a carrier wipe-off 1420 configured to remove the in-phase carrier 402.

The tracking and bit demodulation module 1422 may be configured to estimate data bits of the server received signals 148, 156, and 196.

The tracking and bit demodulation module 1428 may be configured to estimate data bits of client received signals 146, 158, and 162.

The server client data module 172 is configured to construct the client MEO signal signature 164, the client LEO signal signature 166 and the client terrestrial signal signature 168 to provide the signature set 190 as explained above.

The server data module 174 is configured to construct the server MEO signal signature 176, the server LEO signal signature 178 and the server terrestrial signal signature 180 to provide a server signature set 192.

The client signature set 190 and the server signature set 192 are compared by the authentication decision module 1424 to generate the authentication message 124.

Encryption module 1404 and decryption module 1430 are used to further strengthen authentication performance. A client-unique key (or device signature) is concatenated with the GNSS signature set from the client 126. The client-unique key may be based on, for example but without limitation, cryptographic symmetric cryptography (e.g., AES), asymmetric cryptography (e.g., public-private cryptography), physically unclonable functions (PUFs), or other cryptography. The client-unique key is used to modify the client signature set 190 in such a way that position verification at the authentication server 128 is generally only successful if the server's copy of the client-unique key matches one used to create the server signature set.

A satellite signature can be considered as a plaintext for a device encryption. The satellite signature may also contain an underlying client position velocity time (PVT) information that will also be verified by correlating the satellite signature captured by the client 126 with corresponding data at a satellite reference receiver. Thus, a concatenated security system is generated.

Processor modules 1406/1432 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor modules 1406/1432 comprise processing logic that is configured to carry out the functions, techniques, and processing tasks associated with the operation of the system 1400.

In particular, the processing logic is configured to support the authentication method described herein. For example, the processor modules 1406/1432 may each comprise a software configurable radio module 1436 (SCR 1436) operable to select parameters for demodulating signals based on various satellite and terrestrial communication protocols. For example, the SCR 1436 may comprise an MEO processor module 1442, an LEO processor module 1444, and a terrestrial processor module 1446 to demodulate the MEO satellite signal 118, LEO satellite signal 120 of the client received MEO satellite signal 146 and the coded terrestrial signal 160 respectively.

For another example, the client processor module 1406 may be suitably configured to send the client signature set 190 from the client 126 to the authentication server 128 via an antenna (not shown). For another example, the server processor module 1432 may be suitably configured to send the authentication message 144 to another server or to the client 126 via an antenna (not shown). Furthermore, the steps of a method or algorithm described in connection with the embodiments disclosed herein may be embodied directly in hardware, in firmware, in a software module executed by processor modules 1406/1432, or in any combination thereof.

The memory modules 1408/1434, may be realized as a non-volatile storage device (non-volatile semiconductor memory, hard disk device, optical disk device, and the like), a random access storage device (for example, SRAM, DRAM), or any other form of storage medium known in the art. The memory module 1408/1434 may be coupled to the processor modules 1406/1432 respectively such that the processor modules 1406/1432 can read information from, and write information to memory modules 1408/1434.

As an example, the processor module 1406 and memory module 1408, the processor module 1432 and the memory module 1434 may reside in their respective ASICs. The memory modules 1408/1434 may also be integrated into the processor modules 1406/1432 respectively. In an embodiment, the memory module 1408/1434 may include a cache memory for storing temporary variables or other intermediate information during execution of instructions to be executed by processor modules 1406/1432. The memory modules 1408/1434 may also include non-volatile memory for storing instructions to be executed by the processor modules 1406/1432.

For example, the memory modules 1408/1434 may include a location database (not shown) for storing the location signatures 190/192, and other data in accordance with an embodiment of the disclosure. For another example, the client memory module 1408 may store the replica of the digital client received signals 222 at the client 126. Those skilled in the art will understand that the various illustrative blocks, modules, circuits, and processing logic described in connection with the embodiments disclosed herein may be implemented in hardware, computer-readable software, firmware, or any combination thereof. To clearly illustrate this interchangeability and compatibility of hardware, firmware, and software, various illustrative components, blocks, modules, circuits, and steps are described generally in terms of their functionality.

In some embodiments, system 1400 may comprise any number of processor modules, any number of memory modules, any number of transmitter modules, and any number of receiver modules suitable for their operation described herein. The illustrated system 1400 depicts a simple embodiment for ease of description. These and other elements of the system 1400 are interconnected together, allowing communication between the various elements of system 1400. In one embodiment, these and other elements of the system 1400 may be interconnected together via a data communication bus (not shown).

The transmitter module and the receiver module may be located in each processor module 1406/1432 coupled to their respective shared antenna (not shown). Although in a simple module only one shared antenna is required, more sophisticated modules may be provided with multiple and/or more complex antenna configurations. Additionally, although not shown in this FIG. 14, those skilled in the art will recognize that a transmitter may transmit to more than one receiver, and that multiple transmitters may transmit to the same receiver.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Figure 15:
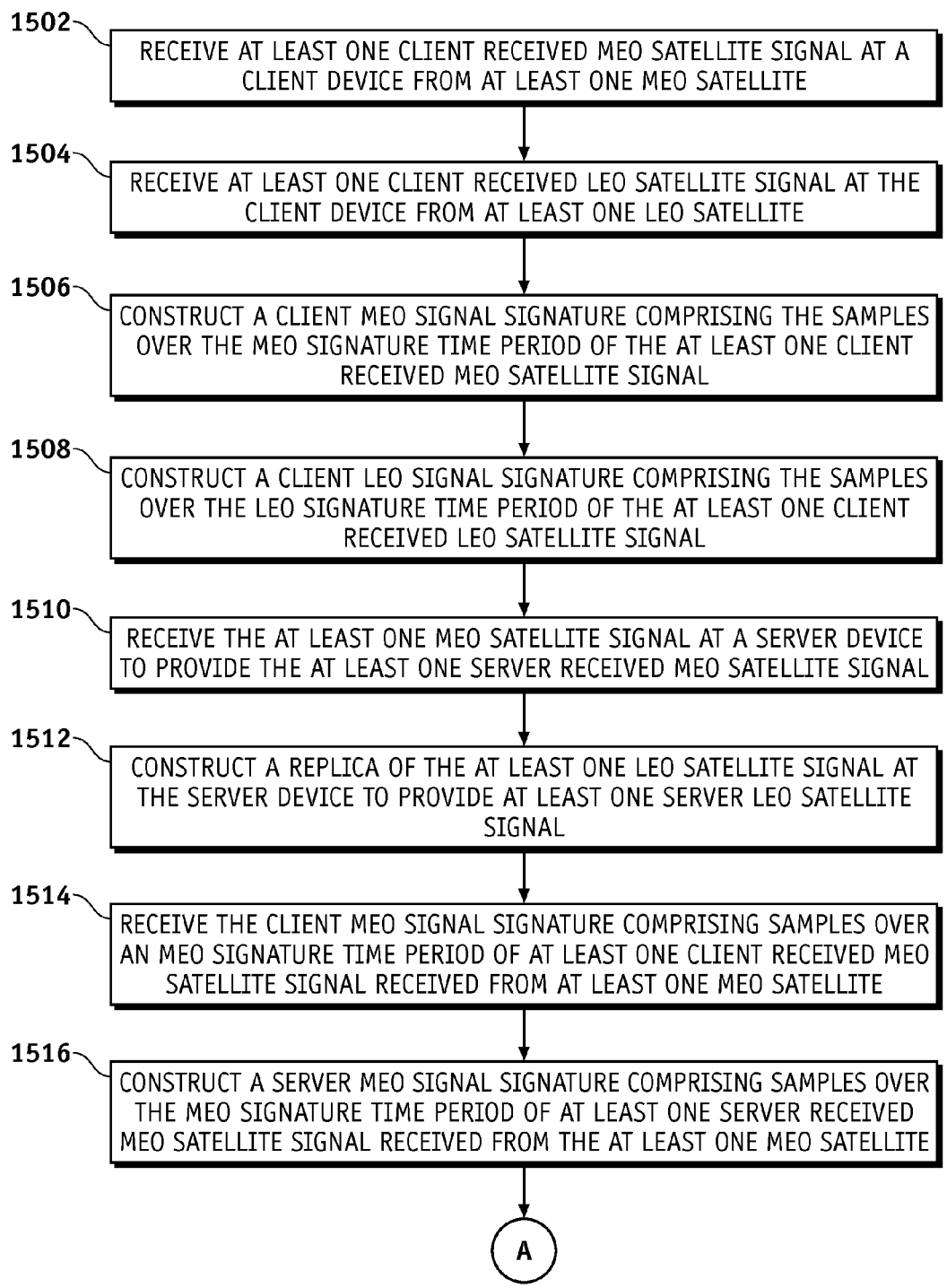
FIG. 15 is an illustration of an exemplary flowchart showing a location-based authentication process according to an embodiment of the disclosure.
Figure 15:
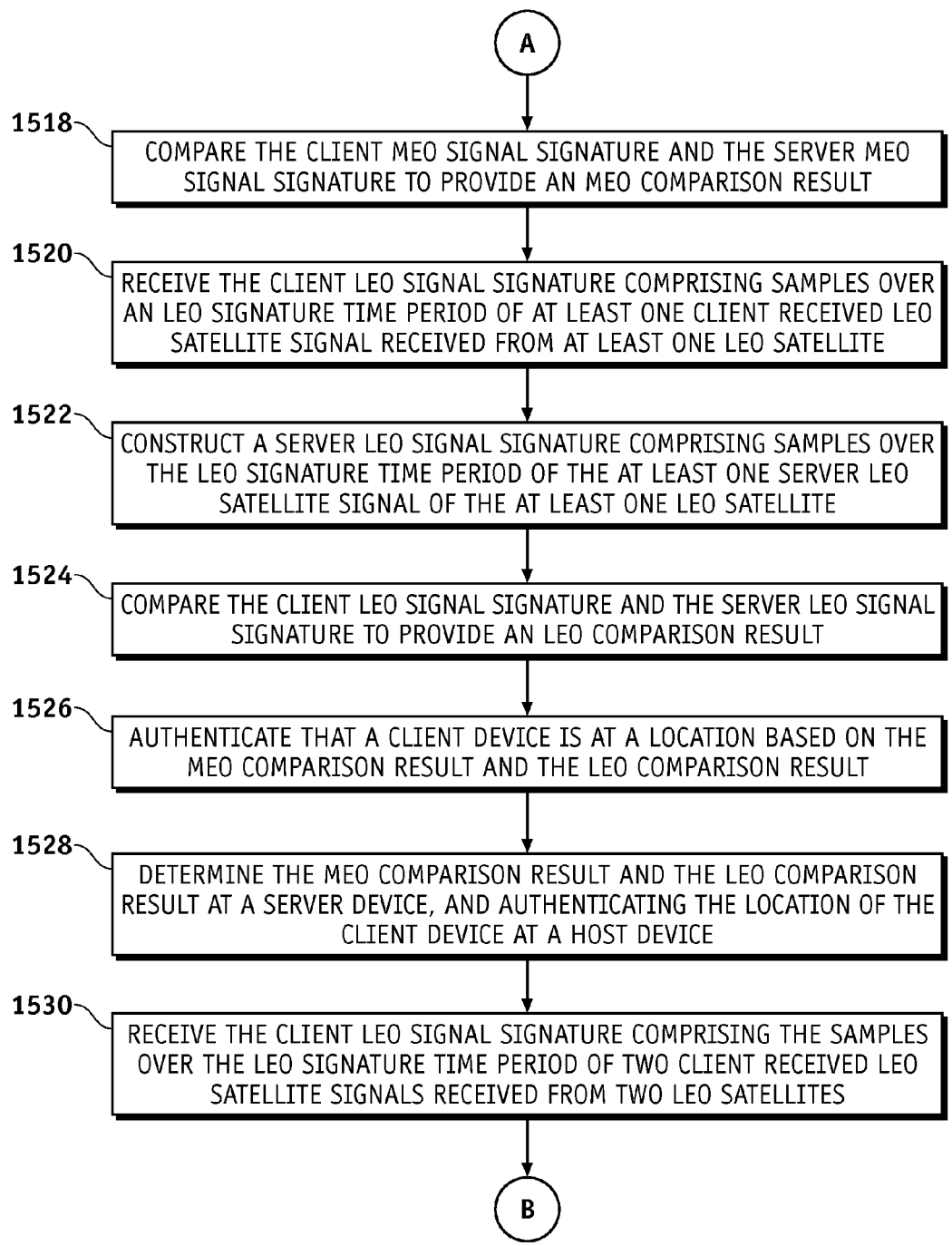
Figure 15:
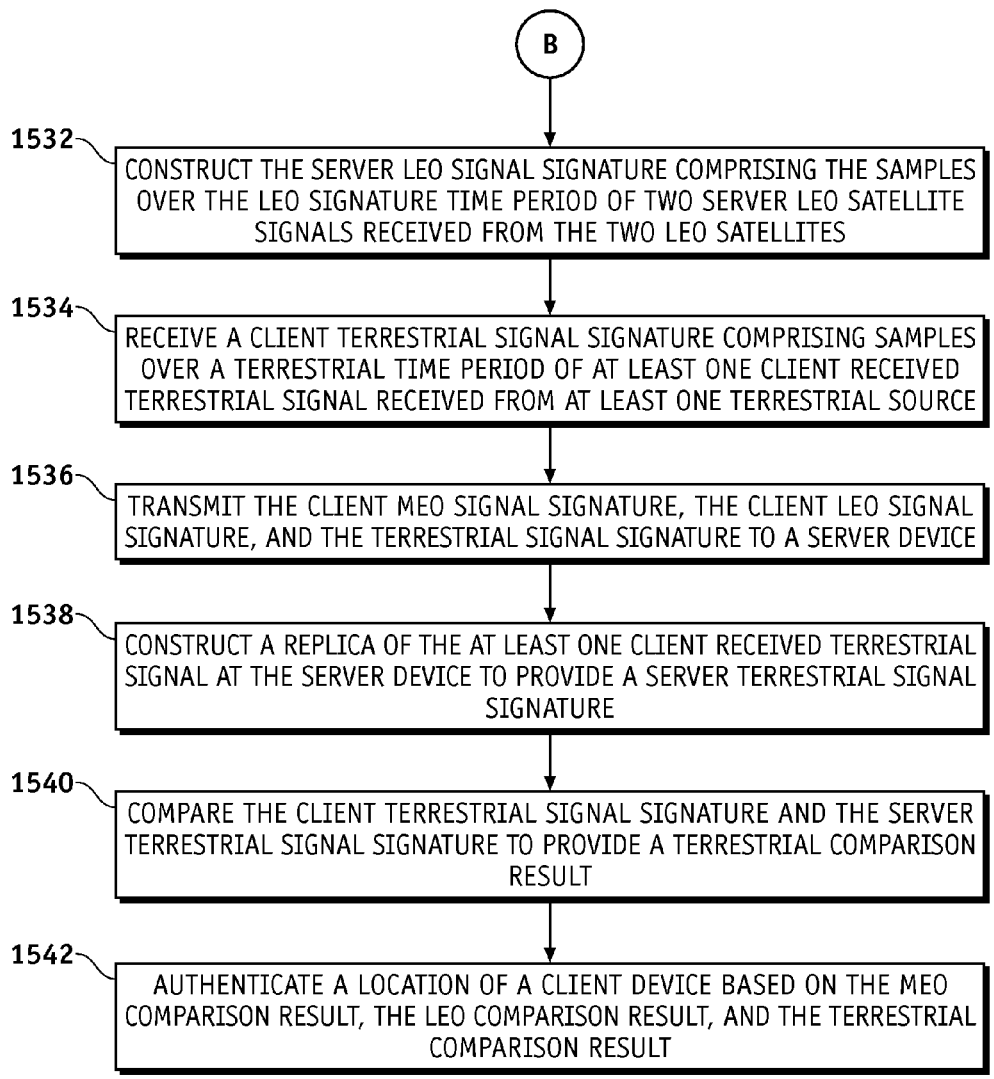

FIG. 15 is an illustration of an exemplary flow chart showing a location-based authentication process 1500 according to an embodiment of the disclosure. The various tasks performed in connection with the process 1500 may be performed by software, hardware, firmware, a computer-readable medium having computer executable instructions for performing the process method, or any combination thereof. The process 1500 may be recorded in a computer-readable medium such as a semiconductor memory, a magnetic disk, an optical disk, and the like, and can be accessed and executed, for example, by a computer CPU such as the processor modules 1406/1432 in which the computer-readable medium is stored.

It should be appreciated that process 1500 may include any number of additional or alternative tasks, the tasks shown in FIG. 15 need not be performed in the illustrated order, and process 1500 may be incorporated into a more comprehensive procedure or process having additional functionality not described in detail herein. In some embodiments, portions of the process 1500 may be performed by different elements of the systems 100 and 1400 such as: the client 126, the authentication server 128, etc. Process 1500 may have functions, material, and structures that are similar to the embodiments shown in FIGS. 1-12. Therefore common features, functions, and elements may not be redundantly described here.

Process 1500 may begin by receiving at least one client received MEO satellite signal at a client device from at least one MEO satellite (task 1502). The at least one MEO satellite may comprise, for example but without limitation, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, or other satellite that can be used to support positioning, navigation, or timing related applications.

Process 1500 may then continue by receiving at least one client received LEO satellite signal at the client device from at least one LEO satellite (task 1504).

Process 1500 may then continue by constructing a client MEO signal signature comprising samples over an MEO signature time period of the at least one client received MEO satellite signal (task 1506).

Process 1500 may then continue by constructing a client LEO signal signature comprising samples over an LEO signature time period of the at least one client received LEO satellite signal (task 1508).

Process 1500 may then continue by receiving the at least one MEO satellite signal at a server device to provide at least one server received MEO satellite signal (task 1510).

Process 1500 may then continue by constructing a replica of the at least one LEO satellite signal at the server device to provide at least one server LEO satellite signal (task 1512).

Process 1500 may continue by receiving the client MEO signal signature comprising samples over the MEO signature time period of the at least one client received MEO satellite signal received from the at least one MEO satellite (task 1514).

Process 1500 may then continue by constructing a server MEO signal signature comprising samples over the MEO signature time period of the at least one server received MEO satellite signal received from the at least one MEO satellite (task 1516).

Process 1500 may then continue by comparing the client MEO signal signature and the server MEO signal signature to provide an MEO comparison result (task 1518).

Process 1500 may then continue by receiving the client LEO signal signature comprising the samples over an LEO signature time period of the at least one client received LEO satellite signal received from the at least one LEO satellite (task 1520).

Process 1500 may then continue by constructing a server LEO signal signature comprising the samples over the LEO signature time period of the at least one server LEO satellite signal of the at least one LEO satellite (task 1522).

Process 1500 may then continue by comparing the client LEO signal signature and the server LEO signal signature to provide an LEO comparison result (task 1524).

Process 1500 may then continue by authenticating that the client device is at a location based on the MEO comparison result and the LEO comparison result (task 1526).

Process 1500 may then continue by determining the MEO comparison result and the LEO comparison result at a server device, and authenticating the location of the client device at a host device (task 1528).

Process 1500 may then continue by receiving the client LEO signal signature comprising the samples over the LEO signature time period of two client received LEO satellite signals received from two LEO satellites (task 1530).

Process 1500 may then continue by constructing the server LEO signal signature comprising the samples over the LEO signature time period of the two server LEO satellite signals of the two LEO satellites (task 1532).

Process 1500 may then continue by receiving a client terrestrial signal signature comprising samples over a terrestrial time period of at least one client received terrestrial signal received from at least one terrestrial source (task 1534).

Process 1500 may then continue by transmitting the client MEO signal signature, the client LEO signal signature, and the terrestrial signal signature to a server device (task 1536).

Process 1500 may then continue by constructing a replica of the at least one client received terrestrial signal at the server device to provide a server terrestrial signal signature (task 1538).

Process 1500 may then continue by comparing the client terrestrial signal signature and the server terrestrial signal signature to provide a terrestrial comparison result (task 1540).

Process 1500 may then continue by authenticating the location of the client device based on the MEO comparison result, the LEO comparison result, and the terrestrial comparison result (task 1542).

Figure 16:
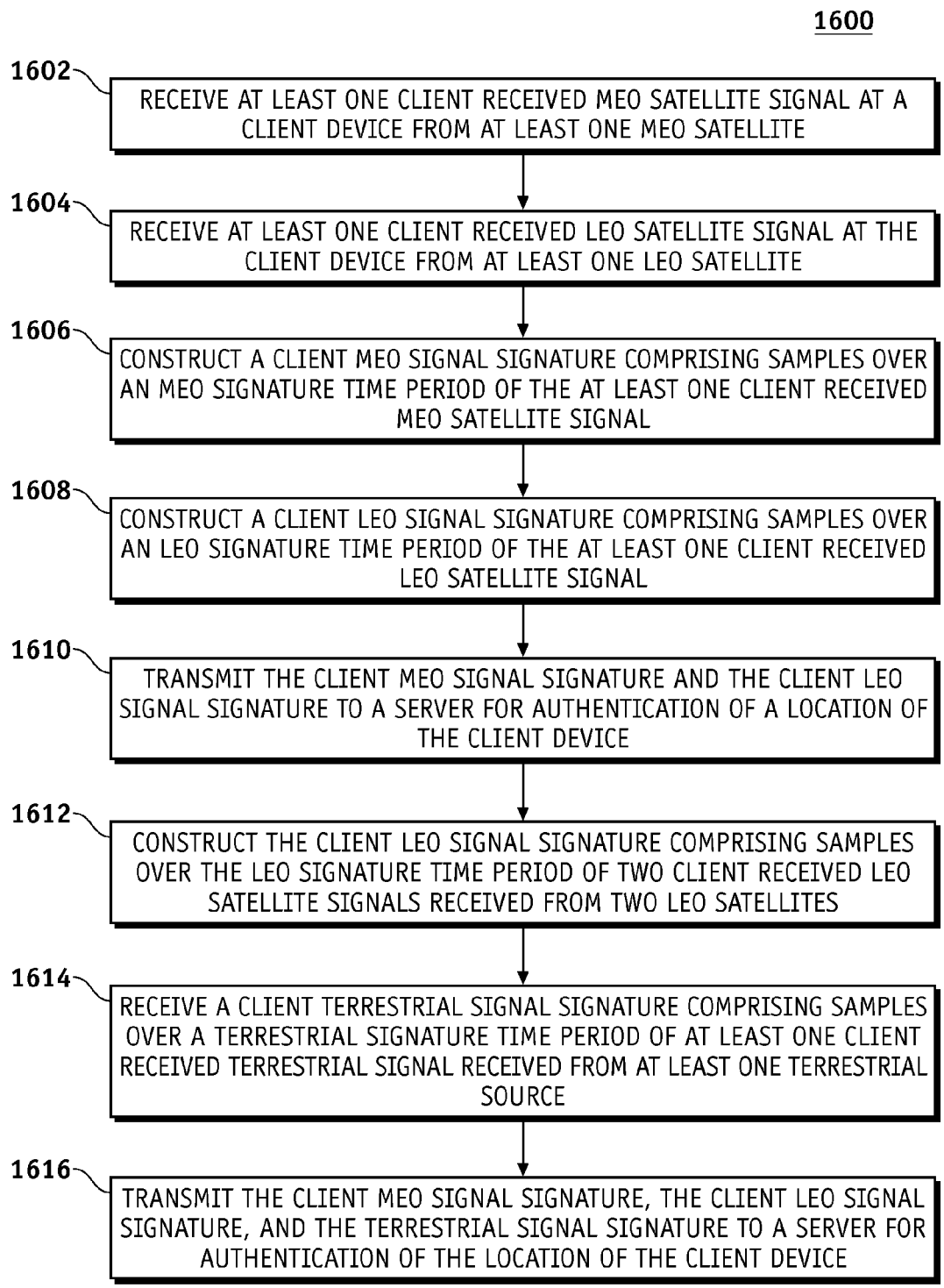
FIG. 16 is an illustration of an exemplary flowchart showing a client location-based authentication process according to an embodiment of the disclosure.

FIG. 16 is an illustration of an exemplary flow chart showing a client location-based authentication process 1600 according to an embodiment of the disclosure. The various tasks performed in connection with the process 1600 may be performed by software, hardware, firmware, a computer-readable medium having computer executable instructions for performing the process method, or any combination thereof. The process 1600 may be recorded in a computer-readable medium such as a semiconductor memory, a magnetic disk, an optical disk, and the like, and can be accessed and executed, for example, by a computer CPU such as the processor modules 1406/1432 in which the computer-readable medium is stored.

It should be appreciated that process 1600 may include any number of additional or alternative tasks, the tasks shown in FIG. 16 need not be performed in the illustrated order, and process 1600 may be incorporated into a more comprehensive procedure or process having additional functionality not described in detail herein. In some embodiments, portions of the process 1600 may be performed by different elements of the systems 100, 600, and 1400 such as: the client 126, the authentication server 128, etc. Process 1600 may have functions, material, and structures that are similar to the embodiments shown in FIGS. 1, 6, and 12. Therefore common features, functions, and elements may not be redundantly described here.

Process 1600 may begin by receiving at least one client received MEO satellite signal at a client device from at least one MEO satellite (task 1602). The at least one MEO satellite may comprise, for example but without limitation, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, or other satellite that can be used to support positioning, navigation, or timing related applications.

Process 1600 may then continue by receiving at least one client received LEO satellite signal at the client device from at least one LEO satellite (task 1604).

Process 1600 may then continue by constructing a client MEO signal signature comprising samples over an MEO signature time period of the at least one client received MEO satellite signal (task 1606).

Process 1600 may then continue by constructing a client LEO signal signature comprising samples over an LEO signature time period of the at least one client received LEO satellite signal (task 1608).

Process 1600 may then continue by transmitting the client MEO signal signature and the client LEO signal signature to a server for authentication of a location of the client device (task 1610).

Process 1600 may then continue by constructing the client LEO signal signature comprising samples over samples over the LEO signature time period of two client received LEO satellite signals received from two LEO satellites (task 1612).

Process 1600 may then continue by receiving a client terrestrial signal signature comprising samples over a client terrestrial time period of at least one client received terrestrial signal received from at least one terrestrial source (task 1614).

Process 1600 may then continue by transmitting the client MEO signal signature, the client LEO signal signature, and the terrestrial signal signature to a server for authentication of the location of the client device (task 1616).

In this manner, embodiments of the disclosure provide protection against spoofing and counterfeiting such as proximate and offshore attacks, and strong coverage in urban and indoor environments where satellites signals are frequently blocked. Embodiments of the disclosure provide an authentication system that allows adequate received signal strength for a navigation satellite signal to be received at a client device located in a low signal-to-noise-ratio (SNR) environment such as indoors and downtown.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the processor modules 1406/1432 to cause the processor modules 1406/1432 to perform specified operations. Such instructions, generally referred to as "computer program code" or "program code" (which may be grouped in the form of computer programs or other groupings), when executed, enable a method of using the systems 100, 600 and 1400.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-12 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for location-based authentication using medium earth orbit (MEO) and low earth orbit (LEO) satellites, the method comprising:
   receiving at a server a client MEO signal signature comprising samples over an MEO signature time period of at least one client received MEO satellite signal received at a client device from at least one MEO satellite;
   constructing a server MEO signal signature comprising samples over the MEO signature time period of at least one server received MEO satellite signal received from the at least one MEO satellite;
   comparing the client MEO signal signature and the server MEO signal signature to provide an MEO comparison result;
   receiving at the server a client LEO signal signature comprising samples over an LEO signature time period of at least one client received LEO satellite signal received at the client device from at least one LEO satellite;
   constructing a server LEO signal signature comprising samples over the LEO signature time period of at least one server LEO satellite signal of the at least one LEO satellite, the server LEO signal signature comprising the samples comprising secure codes from at least two beams overlapping an asserted location of the client device;
   comparing the client LEO signal signature and the server LEO signal signature to provide an LEO comparison result; and
   authenticating that the client device is at the asserted location based on the MEO comparison result and the LEO comparison result to authenticate the asserted location of the client device.

2. The method of claim 1, further comprising:
   determining the MEO comparison result and the LEO comparison result at a server device; and
   authenticating the location of the client device at a host device.

3. The method of claim 1, further comprising:
   receiving the at least one server received MEO satellite signal at a server device from the at least one MEO satellite; and
   constructing a replica of the at least one client received LEO satellite signal at the server device to provide the at least one server LEO satellite signal.

4. The method of claim 1, further comprising:
   receiving the at least one client received MEO satellite signal at the client device from the at least one MEO satellite; and
   receiving the at least one client received LEO satellite signal at the client device from the at least one LEO satellite.

5. The method of claim 1, further comprising:
   constructing the client MEO signal signature comprising the samples over the MEO signature time period of the at least one client received MEO satellite signal; and
   constructing the client LEO signal signature comprising the samples over the LEO signature time period of the at least one client received LEO satellite signal.

6. The method of claim 1, further comprising:
   receiving the client LEO signal signature comprising the samples over the LEO signature time period of two client received LEO satellite signals received from two LEO satellites; and
   constructing the server LEO signal signature comprising the samples over the LEO signature time period of two server LEO satellite signals received from the two LEO satellites.

7. The method of claim 1, further comprising:
   receiving a client terrestrial signal signature comprising samples over a terrestrial time period of at least one client received terrestrial signal received from at least one terrestrial source;
   constructing a replica of at least one client received terrestrial signal at a server device to provide a server terrestrial signal signature; and
   comparing the client terrestrial signal signature and the server terrestrial signal signature to provide a terrestrial comparison result.

8. The method of claim 7, further comprising authenticating a location of a client device based on the MEO comparison result, the LEO comparison result, and the terrestrial comparison result.

9. The method of claim 7, further comprising transmitting the client MEO signal signature, the client LEO signal signature, and the terrestrial signal signature to a server.

10. A location-based authentication system using medium earth orbit (MEO) and low earth orbit (LEO) satellites, the system comprising:
    an authentication module operable to authenticate that a client device is at an asserted location based on at least one client received MEO satellite signal received from at least one MEO satellite at the client device and at least one client received LEO satellite signal received from at least one LEO satellite at the client device, the at least one client received LEO satellite signal comprising secure codes from at least two beams overlapping the asserted location of the client device.

11. The system of claim 10, further comprising:
    a server client data module operable to:
      receive a client MEO signal signature comprising samples over an MEO signature time period of at least one client received MEO satellite signal received from at least one MEO satellite; and
      receive a client LEO signal signature comprising samples over an LEO signature time period of at least one client received LEO satellite signal received from at least one LEO satellite;
    a server data module operable to:
      construct a server MEO signal signature comprising samples over the MEO signature time period of at least one server received MEO satellite signal received from the at least one MEO satellite; and construct a server LEO signal signature comprising samples over the LEO signature time period of at least one server LEO satellite signal of the at least one LEO satellite; and a comparison module operable to:
compare the client MEO signal signature and the server MEO signal signature to provide an MEO comparison result; and
compare the client LEO signal signature and the server LEO signal signature to provide an LEO comparison result.

12. The system of claim 11, wherein:
a server device comprises the comparison module; and
a host device comprises the authentication module.

13. The system of claim 11, wherein the authentication module is further operable to authenticate the location of the client device based on the MEO comparison result and the LEO comparison result.

14. The system of claim 13, wherein:
the client data module is further operable to receive a client terrestrial signal signature comprising a client terrestrial time window of at least one client received terrestrial signal received from at least one terrestrial source;
the server data module is further operable to construct a server terrestrial signal signature comprising a server terrestrial time window of at least one server received terrestrial signal received from the at least one terrestrial source;
the comparison module is further operable to compare the client terrestrial signal signature and the server terrestrial signal signature to provide a terrestrial comparison result; and
the authentication module is further operable to authenticate a location of a client device based on the MEO comparison result, the LEO comparison result, and the terrestrial comparison result.

15. The system of claim 11, further comprising a client signature module configured to:
construct the client MEO signal signature comprising samples over the MEO signature time period of at least one client received MEO satellite signal; and
construct the client LEO signal signature comprising samples over the LEO signature time period of at least one client received LEO satellite signal.

16. The system of claim 11, wherein:
the at least one client received LEO satellite signal comprises two client received LEO satellite signals received from two LEO satellites; and
the at least one server LEO satellite signal comprises two server LEO satellite signals of the two LEO satellites.

17. A non-transitory computer readable storage medium comprising computer-executable instructions for client location-based authentication, the computer-executable instructions comprising:
receiving at least one client received MEO satellite signal at a client device from at least one MEO satellite;
receiving at least one client received LEO satellite signal at the client device from at least one LEO satellite;
constructing a client MEO signal signature comprising samples over an MEO signature time period of the at least one client received MEO satellite signal;
constructing a client LEO signal signature comprising samples over an LEO signature time period of the at least one client received LEO satellite signal, the client LEO signal signature comprising the samples comprising secure codes from at least two beams overlapping an asserted location of the client device; and
transmitting the client MEO signal signature and the client LEO signal signature to a server for authentication of a location of the client device.

18. The non-transitory computer readable storage medium of claim 17, further comprising computer-executable instructions comprising constructing the client LEO signal signature comprising samples over the LEO signature time period of two client received LEO satellite signals received from two LEO satellites.

19. The non-transitory computer readable storage medium of claim 17, further comprising computer-executable instructions comprising receiving a client terrestrial signal signature comprising samples over a terrestrial signature time period of at least one client received terrestrial signal received from at least one terrestrial source.

20. The non-transitory computer readable storage medium of claim 19, further comprising computer-executable instructions comprising transmitting the client MEO signal signature, the client LEO signal signature, and the terrestrial signal signature to a server for authentication of the location of the client device.

* * * * *